United States Patent
Spring et al.

(10) Patent No.: US 12,130,454 B2
(45) Date of Patent: Oct. 29, 2024

(54) MANUFACTURE OF OPTICAL LIGHT GUIDES

(71) Applicant: ams Sensors Singapore Pte. Ltd., Singapore (SG)

(72) Inventors: Nicola Spring, Oberterzen (CH); Hartmut Rudmann, Jona (CH); Markus Rossi, Jona (CH)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 613 days.

(21) Appl. No.: 17/318,345

(22) Filed: May 12, 2021

(65) Prior Publication Data
US 2021/0333445 A1 Oct. 28, 2021

Related U.S. Application Data

(62) Division of application No. 15/522,423, filed as application No. PCT/SG2015/050443 on Nov. 11, 2015, now abandoned.
(Continued)

(51) Int. Cl.
*B29D 11/00* (2006.01)
*F21V 7/00* (2006.01)
(Continued)

(52) U.S. Cl.
CPC ........ *G02B 5/045* (2013.01); *B29D 11/00692* (2013.01); *B29D 11/00721* (2013.01);
(Continued)

(58) Field of Classification Search
CPC ........ B29D 11/00692; B29D 11/00721; G02B 5/045; G02B 6/13; G02B 6/34;
(Continued)

(56) References Cited

U.S. PATENT DOCUMENTS

| 4,671,613 A | 6/1987 | Buhrer |
| 6,204,974 B1 | 3/2001 | Spitzer |

(Continued)

FOREIGN PATENT DOCUMENTS

| CN | 1172956 A | 2/1998 |
| CN | 1708675 A | 12/2005 |

(Continued)

OTHER PUBLICATIONS

International Search Report with Written Opinion for related Application No. PCT/SG2015/050443 dated Feb. 8, 2016 (8 Pages).
(Continued)

*Primary Examiner* — Mathieu D Vargot
(74) *Attorney, Agent, or Firm* — VIERING, JENTSCHURA & PARTNER MBB

(57) ABSTRACT

The method for manufacturing optical light guide elements comprises providing a plurality of initial bars, each initial bar extending along a respective initial-bar direction from a first bar end to a second bar end and having a first side face extending from the first bar end to the second bar end, the first side face being reflective; positioning the initial bars in a row with their respective initial-bar directions aligned parallel to each other and with their respective first surfaces facing towards a neighboring one of the initial bars; and fixing the plurality of initial bars with respect to each other in the position to obtain a bar arrangement.

20 Claims, 13 Drawing Sheets

Related U.S. Application Data

(60) Provisional application No. 62/211,436, filed on Aug. 28, 2015, provisional application No. 62/160,224, filed on May 12, 2015, provisional application No. 62/079,080, filed on Nov. 13, 2014.

(51) Int. Cl.

| | | |
|---|---|---|
| *G02B 3/00* | (2006.01) | |
| *G02B 5/04* | (2006.01) | |
| *G02B 6/12* | (2006.01) | |
| *G02B 6/122* | (2006.01) | |
| *G02B 6/13* | (2006.01) | |
| *G02B 6/34* | (2006.01) | |
| *G02B 13/00* | (2006.01) | |
| *G02B 17/08* | (2006.01) | |
| *G02B 6/43* | (2006.01) | |

(52) U.S. Cl.
CPC .......... *F21V 7/0091* (2013.01); *G02B 3/0062* (2013.01); *G02B 5/04* (2013.01); *G02B 6/12004* (2013.01); *G02B 6/122* (2013.01); *G02B 6/13* (2013.01); *G02B 6/34* (2013.01); *G02B 13/0065* (2013.01); *G02B 17/0856* (2013.01); *G02B 2006/12114* (2013.01); *G02B 2006/12166* (2013.01); *G02B 6/43* (2013.01)

(58) Field of Classification Search
CPC ................ G02B 6/122; G02B 6/12004; G02B 13/0065; G02B 3/0062
See application file for complete search history.

(56) References Cited

U.S. PATENT DOCUMENTS

| | | | |
|---|---|---|---|
| 10,551,602 | B2 | 2/2020 | Spring et al. |
| 11,073,642 | B2* | 7/2021 | Rossi ........................ G02B 5/10 |
| 2002/0025129 | A1 | 2/2002 | Biscardi et al. |
| 2002/0080487 | A1 | 6/2002 | Yajima |
| 2002/0089746 | A1* | 7/2002 | Akitaka ................ H04N 9/3105 |
| | | | 156/99 |
| 2003/0235384 | A1 | 12/2003 | Kaneko |
| 2005/0067087 | A1 | 3/2005 | Sannokyou |
| 2005/0174651 | A1 | 8/2005 | Spitzer et al. |
| 2005/0285020 | A1 | 12/2005 | Murakami et al. |
| 2009/0065132 | A1 | 3/2009 | Yamamoto |
| 2009/0244507 | A1 | 10/2009 | Tani et al. |
| 2010/0133419 | A1 | 6/2010 | Suetake |
| 2012/0134632 | A1 | 3/2012 | Schultz et al. |
| 2012/0062998 | A1 | 5/2012 | Yamamoto et al. |
| 2013/0070338 | A1 | 3/2013 | Gupta et al. |
| 2013/0286686 | A1 | 10/2013 | Kettunen et al. |
| 2014/0218799 | A1 | 8/2014 | Suzuka |
| 2016/0033713 | A1 | 2/2016 | Sun |
| 2016/0370524 | A1 | 12/2016 | Sasaki et al. |

FOREIGN PATENT DOCUMENTS

| | | |
|---|---|---|
| CN | 1867853 A | 11/2006 |
| CN | 101080656 B | 4/2011 |
| EP | 2061093 A1 | 5/2009 |
| JP | S 62-113103 A | 5/1987 |
| JP | H09080211 A | 3/1997 |
| JP | H10274712 A | 10/1998 |
| JP | H11326749 A | 11/1999 |
| JP | 2001033604 A | 2/2001 |
| JP | 2004144678 A | 5/2004 |
| JP | 4006855 B2 | 11/2007 |
| JP | 2009244881 A | 10/2009 |
| JP | 2010129989 A | 6/2010 |
| JP | 2011081354 A | 4/2011 |
| KR | 100523874 B1 | 10/2005 |
| KR | 1020140051108 A | 4/2014 |
| TW | 201239425 A | 10/2012 |
| WO | WO2012/071674 A1 | 6/2012 |
| WO | 2013049948 A1 | 4/2013 |

OTHER PUBLICATIONS

Office Action issued from the Japanese Patent Office for related Application No. 2017-525955 dated Nov. 26, 2019 (5 Pages including Statement of Relevance).

Office Action issued from the Chinese Patent Office for related Application No. 201580059466.1 dated Dec. 10, 2019 (6 Pages including Statement of Relevance).

Japanese Search Report to corresponding JP patent application No. 2017-525955, dated Oct. 23, 2019, 17 pages.

* cited by examiner

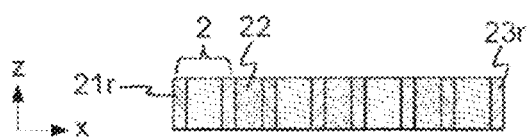
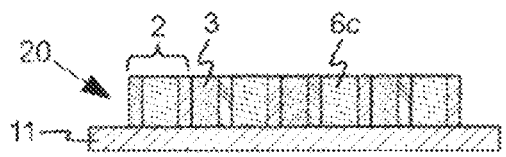
Fig. 28a   Fig. 28b
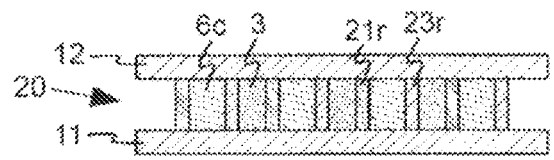
Fig. 28c
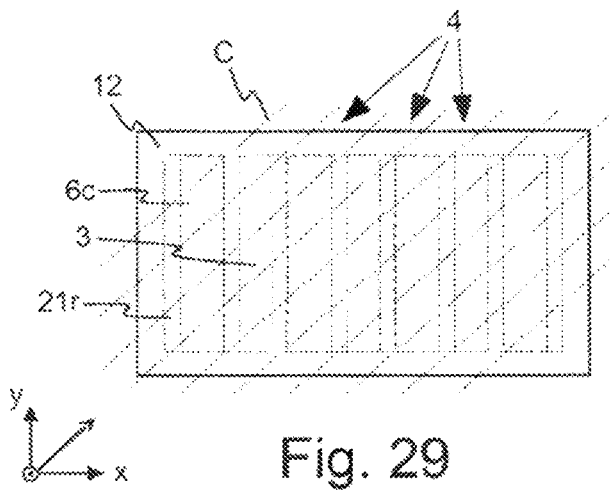
Fig. 29
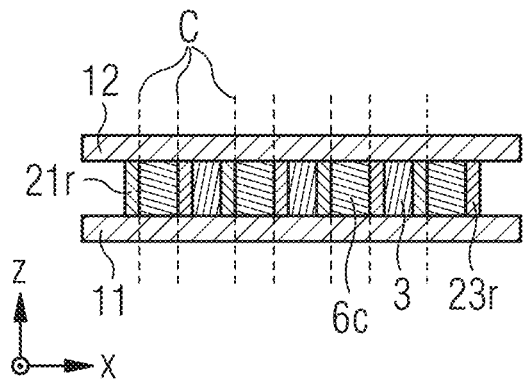
Fig. 30

MANUFACTURE OF OPTICAL LIGHT GUIDES

CROSS REFERENCES TO RELATED APPLICATIONS

This application is a Divisional Application of U.S. patent application Ser. No. 15/522,423, filed Apr. 27, 2017, now abandoned, which is a National Stage Entry of International Application No.: PCT/SG2015/050443 filed Nov. 11, 2015, which claims priority to U.S. Provisional Application No. 62/211,436 filed on Aug. 28, 2015, U.S. Provisional Application No. 62/160,224, filed May 12, 2015, and U.S. Provisional Application No. 62/079,080 filed Nov. 13, 2014, the entire contents of which being incorporated herein by reference.

The invention relates to optical light guide elements and, more specifically, to their manufacture. More particularly, it relates to miniaturized optical light guide elements, e.g., for use in electronic devices such as smart phones and other portable computing devices such as portable computers, tablet computers. And it relates to corresponding electronic devices containing optical light guide elements. In particular, the invention relates to the manufacture of (miniaturized) optical light guide elements taking place, at least in part, on wafer-level.

One object of the invention is to create a way of manufacturing high-precision optical light guide elements.

Another object of the invention is to create a way of manufacturing optical light guide elements in high volumes (mass production).

Further objects and various advantages emerge from the description and embodiments below.

At least one of these objects is at least partially achieved by devices and methods according to the patent claims.

In a first aspect, which is quite specific, the invention can be described, e.g., by the following method:

A method for manufacturing optical light guide elements, the method comprising
  A) providing a plate having a reflective upper face and a reflective lower face which are aligned parallel to each other;
  B) obtaining a plurality of bars referred to as initial bars, each of which is extended along a respective initial-bar direction, by conducting a plurality of cuts through the plate which run parallel to each other and parallel to the initial-bar directions and which create cut faces which are aligned perpendicularly to the upper and lower faces;
  C) positioning the initial bars at a distance to each other in a row, with their bar directions aligned parallel to each other and with a first one of the cut faces of each of the initial bars lying in a first plane and a second one of the cut faces of each of the initial bars lying in a second plane;
  D) obtaining a bar arrangement by attaching a first substrate to the each of the first cut faces and attaching a second substrate to the each of the second cut faces;
  E) obtaining a plurality of bars referred to as prism bars each of which comprises a portion of at least two different ones of the plurality of initial bars, by conducting a plurality of parallel cuts through the bar arrangement;
  F) segmenting each of the prism bars into at least two parts.

The described method can make possible a high-volume production of miniaturized optical light guide elements of high optical precision. A mutual alignment of reflective faces of optical light guide elements may this way be accomplished with very high precision. And the manufacturing method can make possible to manufacture optical light guide elements in which a distance between reflective faces of optical light guide elements contributing to an optical path length inside the optical light guide element is defined with very high precision.

In one embodiment, the plate is coated with a reflective coating, so as to achieve a desired reflectivity.

The coating may comprise a metal coating.

The coating may be comprise a dielectric coating.

The coating may be a multilayer coating, e.g., comprising, in addition to a reflective layer, a protective layer.

In one embodiment, the plate is polished (before and/or after applying an optional coating).

In one embodiment, each of the cuts mentioned in step C) are accomplished by means of one of
  dicing;
  laser cutting;
  laser-scribing and subsequent breaking-apart.

In case of dicing, it may be provided that several passes of a dicing blade employed are conducted. This may reduce stresses in the initial bars.

Steps A) and B) mainly describe a very efficient way of obtaining the initial bars.

The initial bars may be congeneric initial bars. At least, they will usually have the same height (inherited from the plate) and width (from an equidistant cutting).

In some embodiments, the initial bars are (and optionally also the plate is) at least in part made of a non-transparent dielectric material. E.g., the initial bars (and optionally also the plate) can comprise at least one electrically conductive via for establishing an electrical connection through the non-transparent dielectric material across the respective initial bar (and plate, respectively).

The non-transparent dielectric material may be, e.g., a polymer-based material.

The non-transparent dielectric material may be a fiber reinforced material.

For example, the non-transparent dielectric material may be a printed circuit board base material, such as FR4/G10 or polyimide.

Each of the initial bars (and optionally also the plate) can be at least in part constituted by a section of a printed circuit board.

Accordingly, also the prism bars can inherit these properties from the initial bars.

The positioning described in step C) may be understood as a rotation by 90° of each of the initial bars about the respective initial-bar direction and providing a separation between neighboring ones in a direction perpendicular to the initial-bar directions. However, this does not exclude a mutual shifting of neighboring initial bars in a direction parallel to the initial-bar directions.

As is clear from the above, however, it will be provided that the first plane and the second plane are usually aligned parallel to each other.

In one embodiment, two or more plates having a reflective upper face and a reflective lower face which are aligned parallel to each other are stacked upon each other, wherein the cuts mentioned in step B) are conducted through the stack. This can make the production of the initial bars more efficient. A removable bonding material can be applied between neighboring plates in the stack.

In one embodiment, the positioning mentioned in step C) is accomplished by means of a jig. In particular, the initial bars may be held in the jig. Usually, the initial bars are removed from the jig before step E) is accomplished, i.e. before the cuts for producing the prism bars are conducted.

The jig may have one protrusion per initial bar on which the respective initial bar is positioned each, e.g., the respective second cut face facing a top of the respective protrusion. Spacers may be inserted then between neighboring initial bars for ensuring an equidistant positioning of the initial bars in a direction perpendicular to the initial bar directions.

Or the jig may have one groove per initial bar in which one initial bar is inserted each, e.g., the respective second cut face directed into the respective groove.

In one embodiment, the initial bars are held in the jig during the attaching of the first substrate mentioned in step D). It may, more specifically, be provided then, that the jig is removed from the assembly comprising the initial bars and the first substrate, before the second substrate is attached to the initial bars.

In step D), a mutual positioning of the initial bars is fixed by means of the first and second substrates. Accordingly, such a bar arrangement can also be considered a sandwich wafer or a wafer stack. Although the provision of the two substrates may contribute to making possible the manufacture of hermetically closed light guides (which usually have, e.g., an increased lifetime and/or an increased reliability), it is also possible to dispense with one or both of the substrates, cf. also below (second aspect of the invention).

In one embodiment, step D) comprises applying a bonding material, such as a glue, a curable epoxy or the like, to one or both of
the first substrate;
each of the first cut faces;
and to one or both of
the second substrate;
each of the second cut faces.

The application of the bonding material may be accomplished, e.g., using a dispenser (and a needle of the dispenser), or by means of screen printing.

The bonding material may comprise a multitude of solid balls having a common diameter in addition to a liquid or viscous hardenable (e.g., curable) material. This can make possible to achieve very precisely defined distances between parts attached to each other.

The first and second substrates may be transparent or non-transparent. Non-transparency may decrease in a simple way a sensitivity of the light guide element to undesired external light.

In some embodiments, at least one of the first and second substrates is at least in part made of a non-transparent dielectric material. E.g., the first and/or second substrates can comprise at least one electrically conductive via for establishing an electrical connection through the non-transparent dielectric material across the respective substrate.

The non-transparent dielectric material may be, e.g., a polymer-based material.

The non-transparent dielectric material may be a fiber reinforced material.

For example, the non-transparent dielectric material may be a printed circuit board base material, such as FR4/G10 or polyimide.

The first substrate and/or the second substrate can be at least in part constituted by a section of a printed circuit board.

Accordingly, also the prism bars can inherit these properties from the initial bars.

At the end of step D) and at the beginning of and during step E), the initial bars have to remain in their relative positions with high precision.

Step E) is a particularly astute step. In step E), new bars, namely the prism bars, are produced, which have angled or tilted reflective faces, as they are desired in typical optical light guide elements. This may in particular be achieved by cutting at an angle with respect to the initial-bar directions, more particularly such that the cuts are at an angle of 45°±10° with respect to the initial bar directions. The angle can be 45°±5°, e.g., 45°.

Usually, it will be provided that in step E), the parallel cuts are creating cut faces which are aligned perpendicularly to the first and second planes. However, in general, differently aligned cut faces may be produced.

Defining that each of the prism bars is extended along a prism-bar direction, wherein the prism-bar directions are (during the conducting the cuts mentioned in step E)) parallel to the cuts, the prism-bar directions are at an angle (e.g., of 45°±10° or of 45°) with the initial-bar directions.

The prism-bar directions usually correspond to a main direction of light propagation in a finally produced optical light guide element.

In one embodiment, the prism-bar directions are at an angle of 45°±10° with the initial-bar directions, or at 45°±5° with the initial-bar directions, or at 45° with the initial-bar directions. This can be particularly useful for typical optical light guide elements, namely for optical light guide elements receiving light from a direction of incidence and emitting light in an output direction which is parallel to the direction of incidence, wherein a main direction of light propagation in the optical light guide element is perpendicular to both, the direction of incidence and the output direction, and the direction of incidence, the output direction and the main direction are in a common plane.

Of course, for other optical light guide elements, other angles, in particular angles between 20° and 75°, may be used.

It is thus also possible to replace step E) by the following step E'):
E') obtaining a plurality of bars referred to as prism bars, each of which is extended along a prism-bar direction, by conducting a plurality of parallel cuts through the bar arrangement (e.g., through the sandwich wafer) running parallel to the prism-bar directions, the prism-bar directions being at an angle with the initial-bar directions.

The angle can amount to 45°±10°.
The angle can amount to 45°±5°.
The angle can amount to 45°.

(In the following, step E') will typically not be mentioned separately—even though it may apply, as it may replace step E).)

In one embodiment, the method comprises, between step E) and step F), polishing the cut faces produced by conducting the plurality of parallel cuts described in step E) (or in step E')). This makes possible to thin the prism bars; and it can make possible to achieve a highly precise height of the prism bars, in particular superior to a precision achievable using typical dicing saws. In a typical optical light guide geometry, said height finally influences a height of a finally produced optical light guide element in a direction perpendicular to the main direction of light propagation in the optical light guide element within a plane containing the directions of incident and of outputted light of the optical light guide element.

For producing a single optical light guide element, it is usually sufficient to provide no more than two reflective surfaces. Accordingly, for the manufacture of one (single) optical light guide element, only a portion of a prism bar is needed. Accordingly, in step F), the prism bars are segmented into parts.

It is usually provided that at least one of, typically all of:
- each of the parts obtained in step F) constitutes an optical light guide element; or
- each of the parts constitutes a portion of an optical light guide element;
- each of the optical light guide elements comprises one of said parts;
- each of the parts has an extension along the prism-bar direction smaller than an extension along the prism-bar direction of the respective prism bar;
- each of the parts comprising a portion of at least two different ones of the plurality of initial bars.

The segmenting mentioned in step F) typically comprises conducting one or more segmenting steps (e.g., dicing steps) along a cutting line aligned perpendicular to the prism-bar directions.

In one embodiment, the segmenting mentioned in step F) comprises at least one of
- at least one dicing step, e.g., using a wafer saw;
- at least one laser cutting step;

typically a plurality of dicing steps and/or a plurality of laser cutting steps.

For contributing to achieving an hermetically closed optical light guide element and/or for producing an optical light guide element with increased functionality, another step can be inserted between steps E) and F), namely a step in which at least one further substrate (typically two further substrates) is applied to the prism bars. Or rather, the prism bars are attached to at least one further substrate. Accordingly:

In one embodiment, the prism bars are attached to one or more further substrates before step F) is carried out, and by the segmenting mentioned in step F), also the one or more further substrates are segmented, wherein each of the at least two parts comprises a section of the one or more further substrates, e.g., of both further substrates.

Therein, it may be provided that the one or more further substrates comprise (or rather are) one or more wafers on which a plurality of lens elements are present. Each part, in this case, usually comprises at least one of the lens elements.

In some embodiments, at least one of the one or more further substrates is at least in part made of a non-transparent dielectric material. E.g., one or two further substrates can comprise at least one electrically conductive via for establishing an electrical connection through the non-transparent dielectric material across the respective further substrate.

The non-transparent dielectric material may be, e.g., a polymer-based material.

The non-transparent dielectric material may be a fiber reinforced material.

For example, the non-transparent dielectric material may be a printed circuit board base material, such as FR4/G10 or polyimide.

At least one of the further substrates can be at least in part constituted by a section of a printed circuit board.

Accordingly, also the parts (cf. step F) can inherit these properties from the one or more further substrates.

The presence of non-transparent material does, for example, not exclude the presence of lenses which are to be traversed by light guided by the respective light guide element.

For example, one or more transparent portions may be provided in a respective further substrate adjacent to and possibly surrounded by the non-transparent dielectric material so as to provide one or more defined areas for light passing through the respective further substrate. It this noted that this can apply, not only to further substrates, but also (additionally or alternatively) to the first substrates, the second substrates, and/or to the prism bars, the initial bars, the plate.

The one or more further substrates are typically attached to the prism bars at one or more cut faces produced by conducting the plurality of parallel cuts described in step E).

Thus, in a typical embodiment, after attachment of two further substrates, two opposite side walls of the prism bars (and of the finally manufactured optical light guide elements) are constituted by the first and second substrates (or rather, by sections thereof), respectively, and these two opposite side walls are separated from each other by further two opposite side walls of the prism bars (and of the finally manufactured optical light guide elements) which are constituted by one of the further substrates each (or rather, by sections thereof). The mentioned two opposite side walls are typically aligned perpendicularly to the mentioned further two opposite side walls.

By means of the lens elements, light incident on a manufactured optical light guide element and/or light outputted by the optical light guide element can be influenced, e.g., focused.

Even though it is usually more efficient to attach a plurality of prism bars to one and the same further substrate, it is generally also possible to attach no more than only one prism bar to one and the same further substrate.

In case one or more further substrates are provided as described above, the segmenting mentioned in step F) typically comprises conducting one or more segmenting steps (e.g., dicing steps) along a cutting line aligned parallel to the prism-bar directions. By these segmenting steps, at least the one or more further substrates are cut. Optionally, also the prism bars are cut thereby.

At least two different types of finally manufactured optical light guide elements, namely a type I and a type II, may be obtained by the described method. By selecting the location of cut lines at which the segmentation mentioned in step F) is accomplished, it can be defined whether type I and/or type II optical light guide elements are produced.

Light propagating in an optical light guide element along the main direction between two reflective faces of the optical light guide element (the two reflective faces can, e.g., originate from the upper and lower face of the plate, respectively) propagates
- for a type I optical light guide element: in a transparent solid material of an initial bar (and thus in a transparent solid material of the plate present between the upper and lower face of the plate); and
- for a type II optical light guide element: in vacuum or in a gas present between the two reflective faces of the optical light guide element (i.e. in a cavity of the optical light guide element).

Accordingly, said light propagation takes place, in case of type I, within a section of one of the initial bars, and in case of type II, between reflective faces of sections of two initial bars (which were, during step D), neighboring initial bars).

When further bars are used in the manufacture of the optical light guide elements such that each of the produced optical light guide elements comprises a portion of at least one of the further bars, another type optical light guide elements can be manufactured, referred to as type III optical light guide element. Details of further bars and related methods are described below.

For a type III optical light guide element, light propagating in the optical light guide element along the main direction between two reflective faces of the optical light guide element (the two reflective faces can, e.g., originate from the upper and lower face of the plate, respectively) propagates in a transparent solid material of a further bar, wherein it is optionally possible that said light propagates, in addition, in vacuum or in a gas present between the two reflective faces of the optical light guide element (i.e. in at least one cavity of the optical light guide element).

In some embodiments, the light guide elements, e.g., each of the light guide elements, comprise at least one optoelectronic component each.

The optoelectronic component can be accommodated in the cavity (cf. type II and type III optical light guide elements above).

As has been described above for several constituents of the optical light guide elements, said constituents can be made at least in part of a non-transparent dielectric material and/or can be at least in part constituted by a section of a printed circuit board. The optoelectronic component(s) can be attached, e.g., to one of said constituents.

The optoelectronic components can, e.g., be attached to the plate before separating the plate into the initial bars.

The optoelectronic components can, e.g., be attached to the first and/or on the second substrate before attaching the respective substrate to the bar arrangement.

The optoelectronic components can, e.g., be attached to the at least one further substrate before carrying out a segmenting step (in which the prism bars are segmented) for obtaining the at least two parts, or even before applying the at least one further substrate to the prism bars.

The at least one optoelectronic component can be, e.g., an active optical component. It can be a MEMS (microelectromechanical system), such as an array of actuable mirrors.

It can be a light emitting component, e.g., for producing light to be emitted from the optical light guide element in addition to light guided through the optical light guide element. The light emitting component can be, e.g., a light emitting diode or a laser such as VCSEL (vertical cavity surface emitting laser).

It can be a light sensing component, e.g., for sensing light guided through the optical device, such as for sensing a fraction of the light guided through the optical device. The light emitting component may be, e.g., a photodiode.

A new type of optical device can be obtained this way, e.g., an optical device which is an opto-electronic module having light guide properties, or an optical light guide element including an active optical component.

There is a second aspect of the invention, which is more general. Several features and steps of the first aspect of the invention may in fact be optional and thus be omitted.

E.g., steps A) and B) may be optional. The initial bars may be obtained or manufactured in a different way.

And the initial bars do not necessarily need to have two reflective faces, e.g., a single one may be sufficient.

And the initial bars do not need to not have a prism shape with a rectangular base. E.g., the base may be differently shaped: E.g., at least one side face of the initial bars may be curved. E.g., it is possible that curved (and not flat) reflective faces are provided.

However, if the first and second substrates are attached to the positioned initial bars, the provision of initial bars with planar and mutually parallel side faces may be of advantage.

It is also possible to conduct the plurality of cuts through the plate (cf. step B)) which run parallel to each other and parallel to the initial-bar directions in such a way that the create cut faces which are not perpendicularly aligned to the upper and lower faces, but, e.g., aligned at an obtuse angle with the upper face and aligned at an acute angle with the lower face or, vice versa aligned at an acute angle with the upper face and aligned at an obtuse angle with the lower face. Therein, the angles may be those which are visible in a view along the respective initial-bar direction.

Attaching only one substrate to the positioned initial bars may be sufficient, such that no second substrate is needed (cf. step D)). And even further, provided that a suitable positioning device or jig is used for positioning and fixing the initial bars, it is possible to do without both, the first and the second substrate.

The positioning of the initial bars in a row not necessarily requires that they are positioned at a distance to each other. I.e. they may be positioned adjacent to each other, e.g., in particular if only one side face of each initial bar is reflective while an opposite side face may be non-reflective. However, for reducing stray light and minimizing intensity loss for light passing through the optical light guide elements, it may be of advantage to provide that no additional material interface (solid-to-solid, or solid-to-gas or solid-to-vacuum) is present between two reflective faces of the optical light guide elements between which light propagates in the optical light guide element and by which a light propagation direction is changed.

However, it is of course possible to provide, also in the second aspect of the invention, any of the above-described features and any combination of two or more of the described features.

In the second aspect, the invention can be described, e.g., by the following method:

A method for manufacturing optical light guide elements, the method comprising
  a) providing a plurality of bars referred to as initial bars, each initial bar extending along a respective initial-bar direction from a first bar end to a second bar end and having a first side face extending from the first bar end to the second bar end, the first side face being reflective;
  b) positioning the initial bars in a row with their respective initial-bar directions aligned parallel to each other and with their respective first surfaces facing towards a neighboring one of the initial bars;
  c) fixing the plurality of initial bars with respect to each other in the position achieved in step b) to obtain a bar arrangement;
  d) segmenting the bar arrangement into bars referred to as prism bars each of which comprises a portion of at least two different ones of the plurality of initial bars, by conducting a plurality of cuts through the bar arrangement; in particular wherein the cuts can be parallel cuts;
  e) segmenting the prism bars into parts.

Each of the parts may be comprised in one of the optical light guide elements.

Each of the parts may comprise (or even be) one of the optical light guide elements.

There are steps d') and d'') each of which may replace or complement step d):
  d') segmenting the bar arrangement into bars referred to as prism bars by separating the bar arrangement into parts along cut lines, wherein the cut lines are at an angle with the initial-bar directions;

d″) segmenting the bar arrangement into bars referred to as prism bars by separating the bar arrangement into sections by creating cut faces which are at an angle with respect to the initial-bar directions.

In one embodiment, the initial bars are positioned in a distance to each other. But they may, however alternatively be positioned adjacent each other, in particular if, for each of the initial bars, a side face located opposite to the first side face is not reflective.

In the bar arrangement, the initial bars are, in one embodiment, positioned in a distance to each other or are, in another embodiment, positioned adjacent to each other.

The positioning mentioned in step b) may be an equidistant positioning of the initial bars.

In one embodiment, each of the initial bars has a third side face extending from the first bar end to the second bar end, wherein the first side face is reflective. The third side face can be at a distance from the first side face. E.g., the first and the third side faces can be non-adjacent to each other. They can be, e.g., parallel to each other and/or mutually opposite faces of the respective initial bar.

In one embodiment, the method comprises
a*) providing a plurality of bars referred to as further bars, each further bar extending along a respective further-bar direction from a first further bar end to a second further bar end;
b*) positioning, in step b), each of the further bars between two neighboring ones of the initial bars with their respective further-bar direction aligned parallel to the initial-bar directions;
c*) fixing, in step c), the plurality of further bars with respect to each other and with respect to the initial bars in the position achieved in step b) to obtain the bar arrangement.

After segmenting the bar arrangement, each of the prism bars can comprise a portion of at least two different ones of the plurality of further bars.

The further bars can be, in particular, congeneric further bars.

In one embodiment, each of the first side faces comprises a first reflective coating. In this case, the first side faces can be reflective due to the first reflective coatings. In particular it can be provided that each of the initial bars has a third side face extending from the first bar end to the second bar end. In this case, it may be provided that each of the third side faces comprises a third reflective coating. In this case, the third side faces can be reflective due to the third reflective coatings.

However, the reflectivity of the first side faces (and, if present, optionally also the reflectivity of the third side faces) can, in some embodiments, be due to total internal reflection (TIR). In this case, a material comprised in the initial bars has a relatively high index of refraction, e.g., an index of refraction of at least 1.3, or of at least 1.4, or of at least 1.5. In the manufactured optical light guide elements, the first side faces (and, if present, optionally also the third side faces) can be interfacing a gas such as, e.g., air. This way, relatively low refractive indices can be sufficient for TIR.

Each of the manufactured optical light guide elements defines at least one light path for light entering the optical light guide element, passing through the optical light guide element and exiting the optical light guide element. Said at least one light path can comprise a path along which light can propagate along the above-mentioned main direction between two reflective faces of the optical light guide element.

In case the reflectivity of the first side faces (and, if present, optionally also the reflectivity of the third side faces) is due to total internal reflection (TIR), light propagating in the respective manufactured optical light guide element is reflected at the respective first side face (and, if present, optionally also by the respective third side faces) by TIR.

In one embodiment, each of the initial bars has a first, a second, a third and a fourth side faces, each extending from the first to the second bar end, the first and second side faces being planar faces aligned parallel to each other, the third and fourth side faces being separated from each other by and arranged between the first and the second side faces. In particular, the third side face may be reflective (in addition to the first side face).

One or more features described for the first aspect of the invention may, of course, be provided in the second aspect of the invention.

E.g., the various constituents such as initial bars, prism bars, can be at least in part constituted by a section of a printed circuit board. And/or at least one opto-electronic component can be attached thereto.

As is obvious from the above, step C) corresponds to step b), step D) can be understood as a specific version of step c), step E) corresponds approximately to step d), and step F) corresponds to step e).

The invention can furthermore relate to optical light guide elements. Those optical light guide elements can be, e.g., optical light guide elements manufactured as herein described.

And the optical light guide element can be, e.g., an optical light guide element for guiding light inside the optical light guide element between two reflective faces of the optical light guide element referred to as first and second reflective faces along a main direction of the optical light guide element. Said light can in particular be light incident on the optical light guide element along an incidence direction and exiting the optical light guide element along an exit direction. The main direction is at an angle with the incidence direction and at an angle with the exit direction. And the optical light guide element comprises
two mutually parallel outer side panels referred to as first and third outer side panels, the main direction being aligned parallel to the first and third outer side panels;
a first prism comprising two base faces aligned parallel to the first and third outer side panels, one attached to the first outer side panel, the other attached to the third outer side panel.

The first prism comprises, located between the first and third outer side panels, the first reflective face shaped and aligned for redirecting light incident on the optical light guide element along the incidence direction into the main direction. The optical light guide element comprises, located between the first and third outer side panels, a second reflective face shaped and aligned for redirecting light redirected by the first reflective face into the main direction to exit the optical light guide element along the exit direction. The second reflective face is
in a first case, comprised in the first prism; or
in a second case, comprised in a second prism of the optical light guide element, the second prism comprising two further base faces aligned parallel to the first and third outer side panels, one attached to the first outer side panel, the other attached to the third outer side panel, wherein the second prism comprises, between the two further base faces, the second reflective face.

The first and second reflective faces can be aligned parallel to each other.

The first and second reflective faces can be at an angle of 45°±10° with the main direction.

The first and second reflective faces can be at an angle of 45°±5° with the main direction.

The first and second reflective faces can be at an angle of 45° with the main direction.

In the first case, the base faces can have a parallelogram shape.

In one embodiment, the first reflective face is reflective due to a reflective coating.

In another embodiment, the first reflective face is reflective due total internal reflection.

In one embodiment, the second reflective face is reflective due to a reflective coating.

In another embodiment, the second reflective face is reflective due total internal reflection.

In one embodiment, the optical light guide element comprises, in addition, two mutually parallel outer side panels referred to as second and fourth outer side panels, the main direction being aligned parallel to the second and fourth outer side panels. In this embodiment, at least one of the second and fourth outer side panels can comprise at least one lens element. The lens element can be arranged to be traversed by light incident on the optical light guide element along the incidence direction and exiting the optical light guide element along the exit direction.

Of course, the optical light guide element can inherit any feature arising from one of the described manufacturing methods.

Further embodiments and advantages emerge from the following description and the enclosed figures.

Below, the invention is described in more detail by means of examples and the included drawings. The figures show:

FIG. 1 a photography of an optical light guide element of a first type (type I);

FIG. 2 a schematical perspective illustration of an optical light guide element of a first type (type I);

FIG. 3 a photography of an optical light guide element of a second type (type II);

FIG. 4 a schematical perspective illustration of an optical light guide element of a second type (type II);

FIG. 5 a schematical perspective illustration of an optical light guide element of a first type (type I), manufactured using further bars;

FIG. 6 a schematical perspective illustration of an optical light guide element of a second type (type II) using total internal reflection, and manufactured using further bars;

FIGS. 7a-7c schematical illustrations in a top view of a manufacture of initial bars;

FIGS. 8a-8c schematical illustrations in a cross-sectional view of a manufacture of initial bars;

FIGS. 9a-9c schematical illustrations in a cross-sectional view of a positioning of initial bars using a jig;

FIGS. 10a-10b schematical illustrations in a cross-sectional view of a positioning of initial bars using another jig;

FIGS. 11a-11c schematical illustrations in a top view of a manufacture of a bar arrangement;

FIGS. 12a-12c schematical illustrations in a cross-sectional view of the manufacture of a bar arrangement illustrated in FIGS. 11a-11c;

FIG. 13 a schematical illustration in a top view of a manufacture of prism bars from the bar arrangement of FIGS. 11c, 12c;

FIG. 14 a schematical illustration in a cross-sectional view of the manufacture of prism bars illustrated in FIG. 13;

FIG. 15 a schematical cross-sectional view of a prism bar as obtained according to FIGS. 13, 14;

FIG. 16 a schematical illustration in a cross-sectional view of the prism bar of FIG. 15;

FIG. 17 a schematical cross-sectional view of a prism bar;

FIG. 18 a schematical illustration in a cross-sectional view of an attaching of the prism bar of FIG. 17 to a lens wafer for manufacturing a type I optical light guide element;

FIG. 19 a schematical cross-sectional view of the prism bar of FIG. 17 sandwiched between the lens wafer illustrated in FIG. 18 and another lens wafer;

FIG. 20 a schematical cross-sectional view of the wafer stack of FIG. 19, with diffractive optical elements attached;

FIG. 21 a schematical cross-sectional view of an optical light guide element of type I obtained by separating the wafer stack of FIG. 20;

FIG. 22 a schematical cross-sectional view of a prism bar;

FIG. 23 a schematical illustration in a cross-sectional view of a wafer stack for manufacturing a type I optical light guide element, comprising the prism bar of FIG. 22 attached to a lens wafer;

FIG. 24 a schematical cross-sectional view of the wafer stack of FIG. 23 with another lens wafer attached;

FIG. 25 a schematical cross-sectional view of the wafer stack of FIG. 24, with diffractive optical elements attached;

FIG. 26 a schematical cross-sectional view of an optical light guide element of type II obtained by separating the wafer stack of FIG. 25;

FIGS. 27a-27c schematical illustrations in a top view of a manufacture of a bar arrangement comprising initial bars and further bars;

FIGS. 28a-28c schematical illustrations in a cross-sectional view of the manufacture of a bar arrangement illustrated in FIGS. 27a-27c;

FIG. 29 a schematical illustration in a top view of a manufacture of a prism bar from the bar arrangement of FIGS. 27c, 28c;

FIG. 30 a schematical illustration in a cross-sectional view of the manufacture of a prism bar illustrated in FIG. 29;

FIG. 31 a schematical cross-sectional view of a prism bar as obtained according to FIGS. 29, 30;

FIG. 32 a schematical cross-sectional illustration of the prism bar of FIG. 31, with separation lines illustrated for producing type I optical light guide elements with further bars as filler bars;

FIG. 33 a schematical cross-sectional illustration of the prism bar of FIG. 31, with separation lines illustrated for producing type I optical light guide elements with initial bars as filler bars;

FIG. 34 a schematical illustration of a bar arrangement comprising further bars and, at a distance thereto, initial bars which are not coated;

FIG. 35 a schematical cross-sectional illustration of the bar arrangement of FIG. 35 sandwiched between two substrates;

FIG. 36 a schematical cross-sectional illustration of a prism bar obtained from the bar arrangement of FIG. 35, with separation lines illustrated for use as a type I optical light guide element with reflectivity by total internal reflection and with further bars as filler bars;

FIG. 37 a schematical cross-sectional illustration of a prism bar obtained from a bar arrangement with filler bars at a distance to the initial bars, with separation lines illustrated for use as a type III optical light guide element with initial bars as filler bars;

FIG. 38 a schematical cross-sectional view of an optical light guide element of type II including in the cavity an opto-electronic component at a side panel;

FIG. 39 a schematical cross-sectional view of an optical light guide element of type II including in the cavity an opto-electronic component at a prism.

The described embodiments are meant as examples or for clarifying the invention and shall not limit the invention.

FIG. 1 is a photography of an optical light guide element 1 of a first type (type I); FIG. 2 a schematical perspective illustration of an optical light guide element of a first type (type I). Since the optical light guide elements 1 of FIGS. 1 and 2 are, to a large extent, identical (they differ mainly in some dimensions), they are described together, in the following.

The optical light guide element 1 includes a prism 40 having two reflective faces 51, 52 embodied, e.g., by two reflective coatings 21r, 23r. Light entering the optical light guide element 1 through lens element 15 is reflected by reflective face 52 along a main direction of the optical light guide element 1 onto reflective face 51 which again redirects the light out of optical light guide element 1, e.g., through another lens element (which would be not visible in FIGS. 1, 2).

Optical light guide element 1 includes first and third outer side panels 61, 63 which are aligned parallel to base faces 9, 72 of prism 40, and to which base faces 71, 72 are fixed.

Optical light guide element 1 further includes second and fourth outer side panels 62, 64, which are sections 13a and 14a, respectively, of a lens wafer (cf. below).

Optical light guide element 1 has, within a cuboid described by the outer side panels 61, 62, 63, 64, two cavities 9, 9'.

In the same way as FIGS. 1 and 2, FIGS. 3 and 4 illustrate an optical light guide element 1 of a second type (type II). Since many features of the illustrated type II optical light guide element 1 of FIGS. 3, 4 are identical with features of the optical light guide element 1 of FIGS. 1, 2, mainly the differences will be explained in the following.

In this optical light guide element 1 of FIGS. 3, 4, the optical light guide element 1 includes two prisms 41, 42 which are at a distance. Between prisms 41, 42, there is a cavity 9". Cavity 9" can be enclosed, in particular hermetically enclosed, by outer side panels 61, 62, 63, 63 and prisms 41, 42, as it is the case in the embodiment of FIGS. 3, 4.

Prism 41 has base faces 71, 72, and prism 42 has base face 73 and another base face not visible in FIGS. 3, 4. Each of the base faces is aligned parallel to and is fixed to one of outer side panels 61, 62.

Light entering optical light guide element 1 through lens element 15 is reflected by first and second reflective faces 51, 52 and propagates between first and second reflective faces 51, 52 inside cavity 9" along the main direction.

FIG. 5 is a schematical perspective illustration of an optical light guide element 1 of the first type (type I), which is manufactured using further bars (cf. below).

In this case, optical light guide element 1 includes three prisms 40, 41, 42 which roughly correspond to prisms 40, 41, 42 of FIGS. 1 through 4. As illustrated in FIG. 5, prism 40 can be adjacent to both, prism 41 and prism 42. In this case, it can be provided that optical light guide element 1 comprises no cavity.

There are different ways of manufacturing a light guide as illustrated in FIG. 5. In one way, both, first and second reflective faces 51, 52 (which may be realized by reflective coatings 21r and 23r, respectively), are included in prism 40. In this case, a reflective coating of one of the other prisms 41, 42 can be dispensed with. And in this case, the optical light guide element 1 is of type I.

In another way, reflective face 51 is realized by prism 41, e.g., by a reflective coating 21r, and reflective face 52 is realized by prism 42, e.g., by a reflective coating 23r. In this case, the optical light guide element 1 is of type III, because light propagating inside optical light guide element 1 along the main direction does not propagate through a prism bearing the reflective faces (which would be obtained from an initial bar, cf. below).

And still in another way, reflective face 52 is realized by prism 42, and reflective face 51 is realized by prism 40; or reflective face 52 is realized by prism 40, and reflective face 51 is realized by prism 41. This way, optical light guide element 1 could be a type I optical light guide element.

The base faces of the prisms are, also in case of FIG. 3, fixed at the inner side of outer side panels 61 and 63, respectively.

FIG. 6 is a schematical perspective illustration of an optical light guide element 1 of a second type (type II) using total internal reflection (TIR), and manufactured using further bars (cf. below).

In this case, optical light guide element 1 includes three prisms 40, 41, 42 which roughly correspond to prisms 40, 41, 42 of FIGS. 1 through 5. However, prism 40 is free of a reflective coating at reflective faces 51, 52. Between prism 40 and prism 41 and between prism 40 and prism 42, cavities 9 and 9', respectively, are present. The transparent material from which prism 40 is made has a relatively high index of refraction, such that light entering optical light guide element 1 through lens 15 will be reflected towards reflective face 52 by reflective face 51 by TIR. E.g., the index of refraction of prism 40 can be 1.5 or higher. In the cavities 9, 9', there can be a vacuum or a gas such as air.

Prisms 41, 42 can protect reflective faces 51, 52 from dirt and damage.

In another embodiment based on FIG. 6, prisms 41, 42 can be dispensed with.

In the following, ways of manufacturing optical light guide elements, such as optical light guide elements 1 of one or more of FIGS. 1 through 6, are explained. In many of the Figures, small coordinate systems are symbolized for explaining the orientation of the illustrated parts. Therein, x, y, z designate coordinates related to the initial bars, while x', y', z' designate coordinates related to prism bars.

The manufacturing can be accomplished on wafer level, thus making possible to manufacture high numbers of high precision parts within a relatively small period of time and/or by means of a relatively low number of processing steps.

FIGS. 7a-7c are schematical illustrations in a top view of a manufacture of initial bars 2. FIGS. 8a-8c are schematical illustrations in a cross-sectional view of the manufacture of initial bars 2.

FIGS. 7a, 8a illustrate a plate 6 having an upper face 6a and a lower face 6b, wherein a first reflective coating 21r is present at face 6a, and a second reflective coating 23r is present at face 6b. Between coatings 21r, 23r, an optically transparent material 6c can be present.

As is clear from the above and from the below, reflective coatings, such as coatings 21r, 23r, can, in some instances, be dispensed with.

Plate 6 is, in some instances further below, also referred to as "P/C wafer".

In FIGS. 7b, 8b, separation lines are indicated by dashed lines, which are also symbolized in the coordinate systems.

By separating plate 6 along these lines, a plurality of initial bars 2 is obtained, as illustrated in FIGS. 7c, 8c.

Each initial bar 2 has a first bar end 28 and a second bar end 29 and four side faces 21, 22, 23, 24, wherein reflective coating 21r is at side face 21, and reflective coating 23r is at side face 23.

In order to produce a bar arrangement 20 (cf., e.g., FIGS. 11a, 12a), the initial bars 2 have to be positioned suitably. Therein, reflective faces of the initial bars 2 face each other. I.e. with respect to the mutual orientation the initial bars have during separation of plate 6 (cf. FIGS. 7c, 8c), each initial bar is rotated by 90° about the y axis corresponding to an initial-bar direction D, cf. FIG. 7c.

One way of positioning the initial bars 2 is to use a jig 8 as illustrated in FIGS. 9a-9c.

FIGS. 9a-9c are schematical illustrations in a cross-sectional view of a positioning of initial bars 2 using a jig 8.

Jig 8 has a plurality of protrusions 81 on which an initial bar 2 can be positioned each. After attaching initial bars 2 to protrusions 81, spacers 8a are inserted between the initial bars 2 (cf. FIG. 9b). The spacers 8a can also be considered shims.

By application of a force, e.g., by a spring or by applying a vacuum, a suitable, e.g., equidistant, spacing of the initial bars 2 is achieved, cf. FIG. 9c.

Also other jigs may, alternatively, be used, e.g., jig 8' as illustrated in FIGS. 10a, 10b.

FIGS. 10a-10b are schematical illustrations in a cross-sectional view of a positioning of initial bars 2 using another jig 8'.

Jig 8' has grooves 8b into which initial bars 2 can be inserted, thus ensuring a precise mutual alignment of the initial bars 2.

A jig is used for the positioning only and will be removed later.

Positioning the initial bars alone or together with further bars (cf. below) without using a jig is possible, too, e.g., by simply pushing the bars against each other, each one against its one or two neighboring ones, cf., e.g., FIGS. 27a, 28a below.

FIGS. 11a, 12a show the bars positioned as required for the desired bar arrangement. A jig possibly used for the positioning of the initial bars 2 is not illustrated in FIGS. 11a, 12a.

Figure 11A:
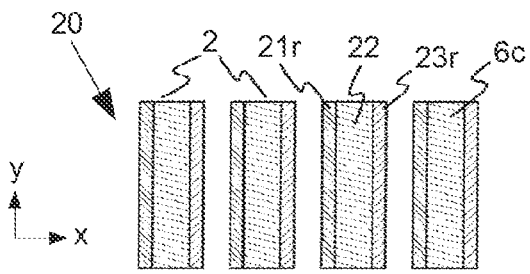
FIGS. 11a-11c are schematical illustrations in a top view of a manufacture of a bar arrangement 20, e.g., based on bars positioned as described above.
Figure 12A:
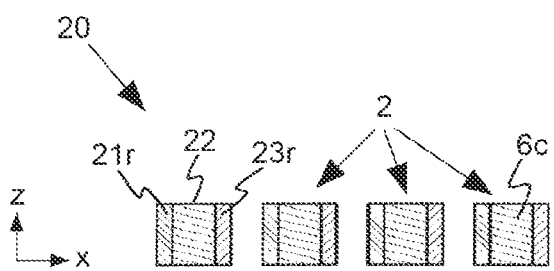
FIGS. 12a-12c are schematical illustrations in a cross-sectional view of the manufacture of a bar arrangement illustrated in FIGS. 11a-11c.

The initial bars 2 can be fixed relative to each other by attaching one or two substrates to the bar arrangement 20. After attachment to a first substrate, a jig, if applied before, can be removed from the bar arrangement. However, the positioned initial bars as illustrated, e.g., in FIGS. 11a, 12a can represent a bar arrangement, too.

Figure 11B:
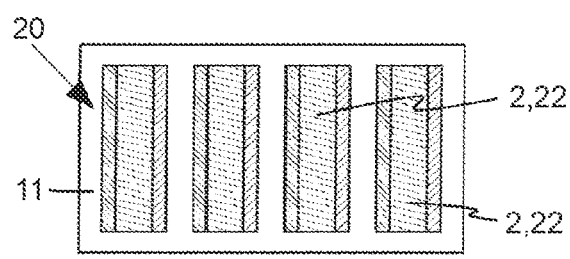
Figure 12B:
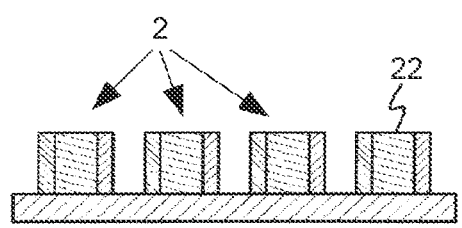

FIGS. 11b, 12b illustrate attaching a first substrate 11 to bar arrangement 20.

Figure 11C:
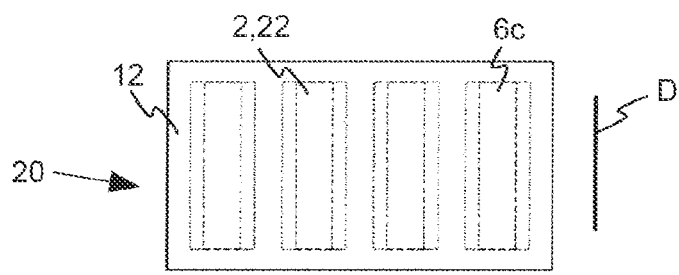
Figure 12C:
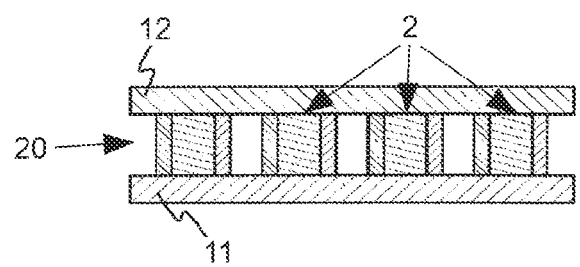

FIGS. 11c, 12c illustrate attaching a second substrate 12 to bar arrangement 20.

Now, the initial bars 2 are sandwiched between first and second substrates 11, 12. A wafer stack is obtained in which the initial bars 2 are mutually positioned with high precision.

In a next step, the obtained wafer stack of FIGS. 11c, 12c is separated into bars referred to as prism bars. Therein, cut lines C of the separation are at an angle with the initial-bar lines D, e.g., at an angle of 45°, as illustrated below.

Figure 13:
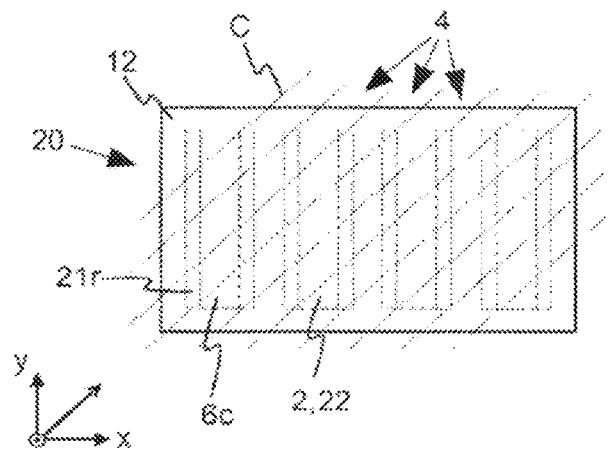
Figure 14:
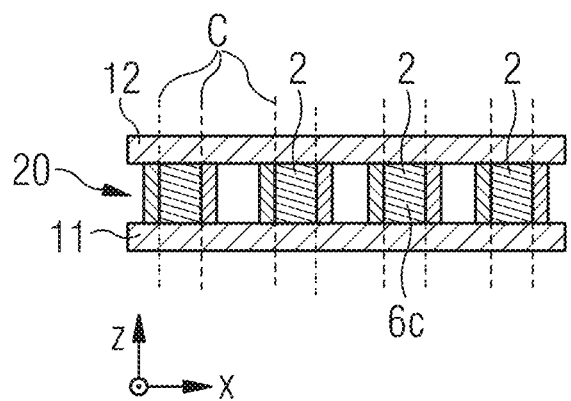

FIG. 13 is a schematical illustration in a top view of a manufacture of prism bars 4 from the bar arrangement 20 of FIGS. 11c, 12c; and FIG. 14 is a schematical illustration in a cross-sectional view of the manufacture of prism bars 4 illustrated in FIG. 13.

Figure 15:
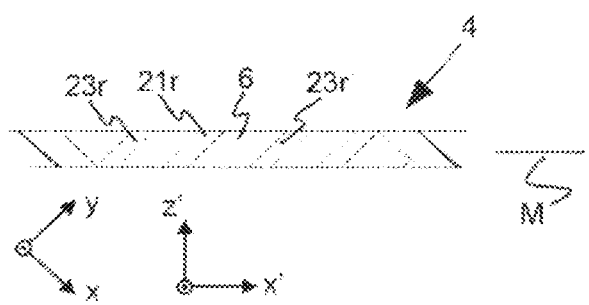
Figure 16:
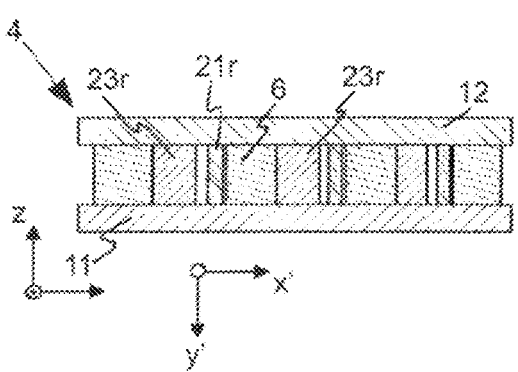

FIG. 15 is a schematical cross-sectional view of a prism bar 4 as obtained according to FIGS. 13, 14; and FIG. 16 is a schematical illustration in a cross-sectional view of the prism bar of FIG. 15. Note the coordinate systems. FIG. 15 is basically a detail of FIG. 13.

In the coordinate system of the prism bar 4, x' is a coordinate along the extension of the prism bar 4—which runs somewhere (depending on the cutting angle) between the x and y coordinates of the initial bar coordinate system. It corresponds, in the produced optical light guide element to the main direction M of the optical light guide element. And z' is a height coordinate of the prism bar 4—which corresponds to the opposite direction of the y coordinate.

Figure 17:
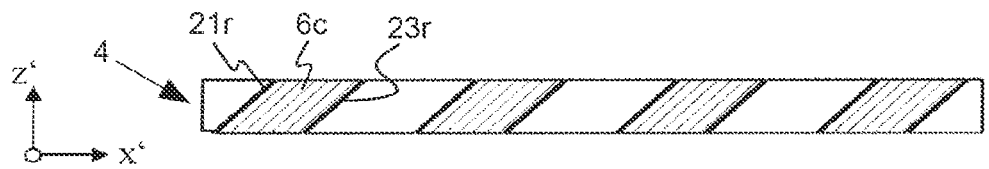

FIG. 17 is a schematical cross-sectional view of a prism bar 4, illustrated in a way slightly different from FIG. 15. Reflective coatings are symbolized by thick lines.

Figure 18:
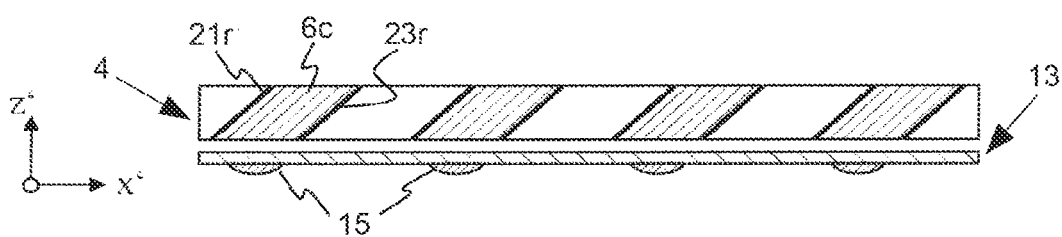

FIG. 18 is a schematical illustration in a cross-sectional view of an attaching of the prism bar 4 of FIG. 17 to a lens wafer 13 for manufacturing a type I optical light guide element. Lens wafer 13—which may also be considered a "further substrate"—includes a plurality of lens elements 15. It is possible to position a plurality of prism bars 4 on such a lens wafer 13, e.g., using pick-and-place.

Figure 19:
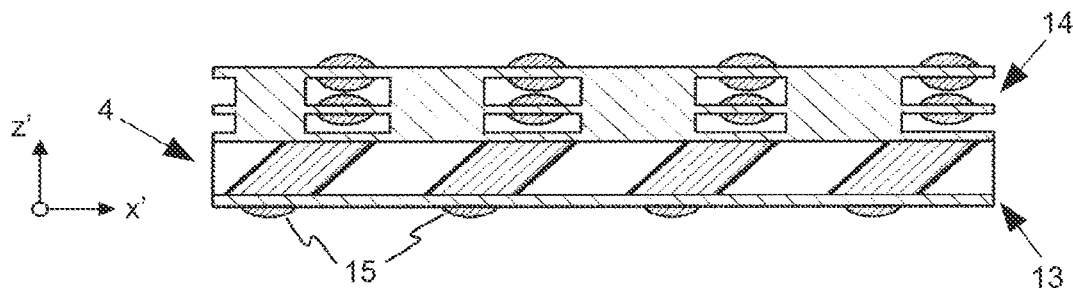

FIG. 19 is a schematical cross-sectional view of the prism bar of FIG. 17 sandwiched between the lens wafer illustrated in FIG. 18 and another lens wafer 14 (which may also be considered a "further substrate").

Figure 20:
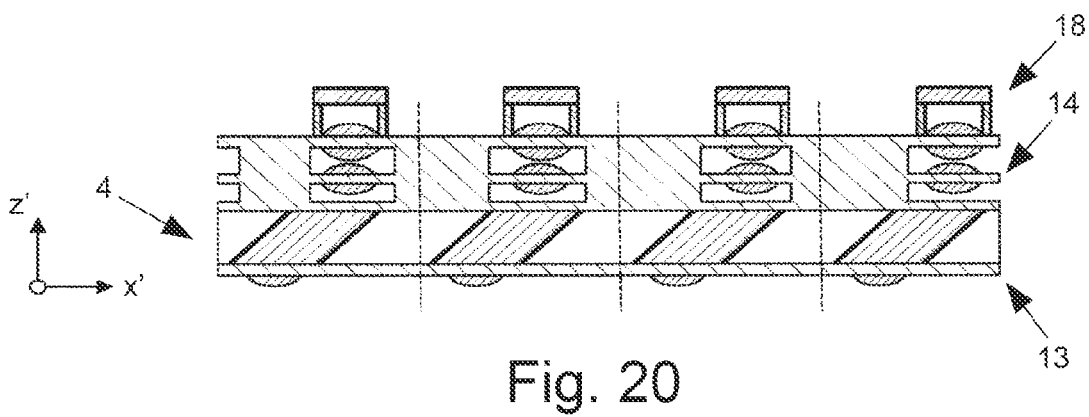

FIG. 20 is a schematical cross-sectional view of the wafer stack of FIG. 19, with diffractive optical elements 18 attached, e.g., by pick-and-place on wafer level. The dashed lines indicate dicing lines, for a next step in which the wafer stack is singulated into parts.

Figure 21:
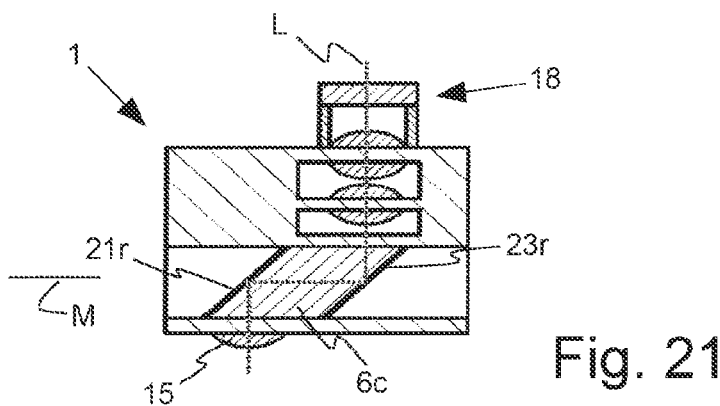
Figure 22:
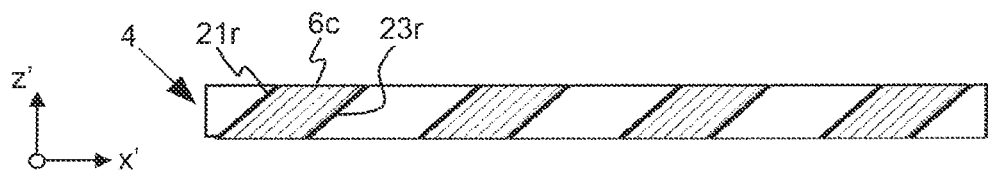
Figure 23:
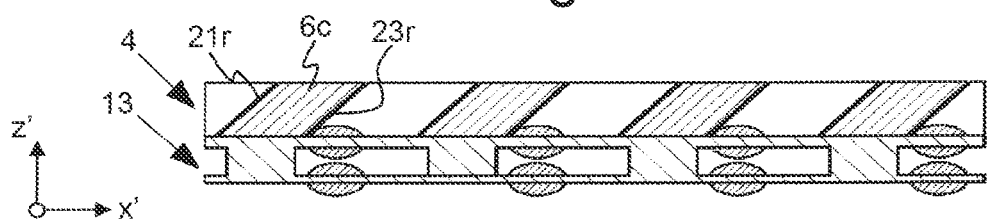
Figure 24:
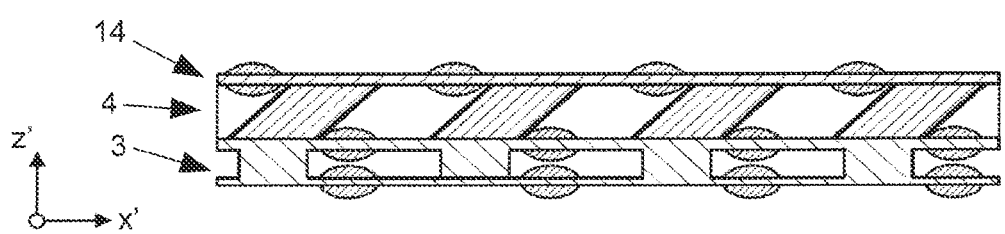

FIG. 21 is a schematical cross-sectional view of an optical light guide element 1 of type I obtained by separating the wafer stack of FIG. 20 in parts as indicated in FIG. 20. A light path into, through and out of the optical light guide element 1 is illustrated by the dotted line designated L. From this, it is readily understood how the properties of initial bars 2 and prism bars 4 and their constituents translate into properties of the optical light guide element 1.

FIGS. 22 to 25 illustrate, in the same way as FIGS. 17 to 20 do, the manufacture of a wafer stack with prism bars 4 and two further wafers 13, 14 such as the illustrated lens wafers 13, 14.

Figure 25:
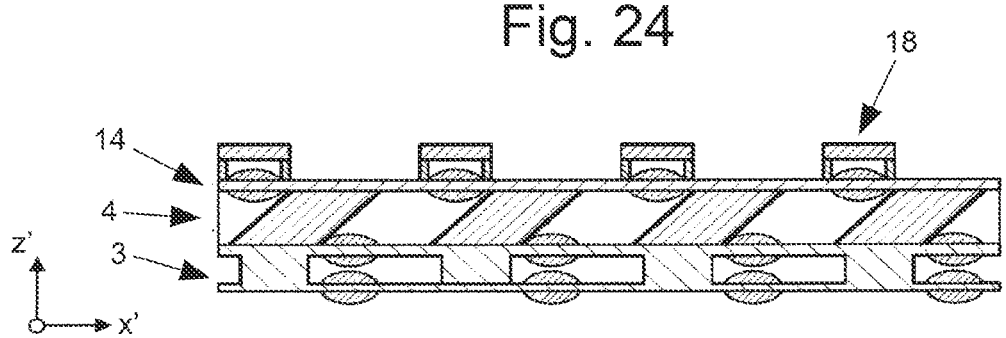
Figure 26:
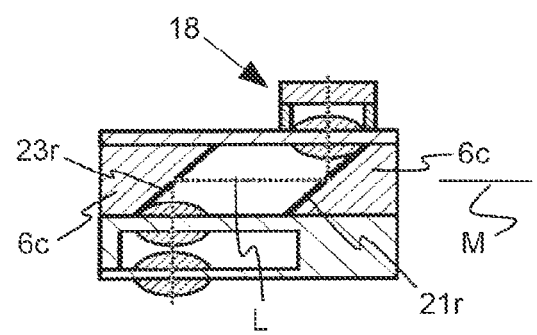

FIG. 26 is a schematical cross-sectional view of an optical light guide element of type II obtained by separating the wafer stack of FIG. 25 into parts. A light path into, through and out of the optical light guide element 1 is illustrated by the dotted line designated L. From this, it is clear how the properties of initial bars 2 and prism bars 4 and their constituents translate into properties of the optical light guide element 1.

The addition of one or more further substrates such as lens wafers 13 and/or 14 as described above is generally an option. It is, accordingly, also possible to separate a prism bar 4 (such as the one of FIGS. 15, 16) into parts—without attaching further substrates beforehand.

As has been mentioned before, it is possible to make use of "further bars", in addition to the initial bars 2, in the manufacture of optical light guide elements. This opens up the possibility to realize further embodiments.

The initial bars 2 can, in some embodiments, be congeneric, as illustrated in the examples above.

And, the further bars can, in some embodiments, be congeneric, as illustrated in the examples below.

Figures 27A, 27B:
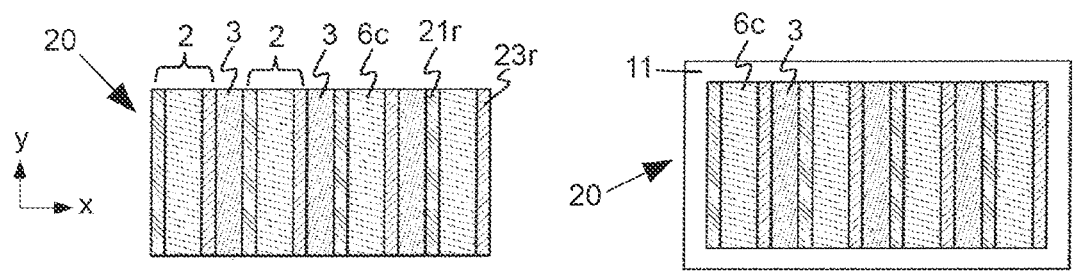
Figure 27C:
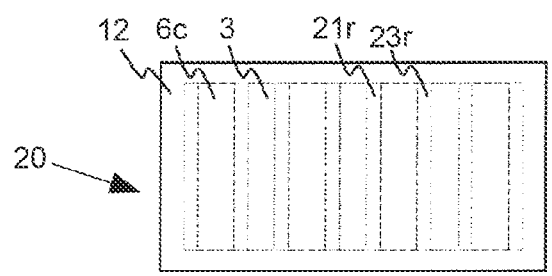

FIGS. 27a-27c are schematical illustrations in a top view of a manufacture of a bar arrangement 20 comprising initial bars 2 and further bars 3. FIGS. 28a-28c are schematical illustrations in a cross-sectional view of the manufacture of a bar arrangement illustrated in FIGS. 27a-27c. Further bars 3 can be manufactured in the same way as initial bars 2 are manufactured. They may be obtained by separating a plate, referred to as further plate, into bars. Such a further plate can, e.g., be provided with a reflective coating on one of its large faces or with reflective coatings on both of its large faces. But in some embodiments, the further plate does not have a reflective coating.prism FIG. 29 is a schematical illustration in a top view of a manufacture of a prism bar 4 from the bar arrangement of FIGS. 27c, 28c; and FIG. 30 is a schematical illustration in a cross-sectional view of the manufacture of a prism bar illustrated in FIG. 29.

The method steps illustrated in FIGS. 27 through 30 are clear, at least when taking FIGS. 11 through 14 into consideration.

Figure 31:
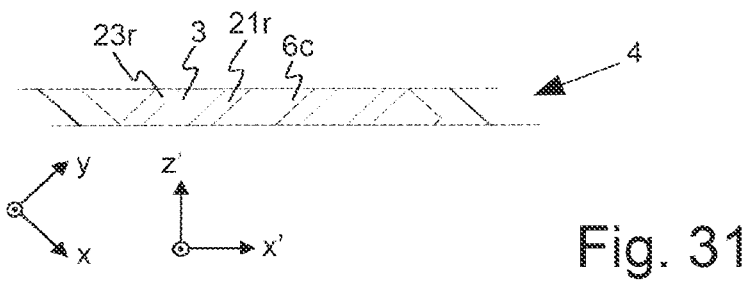

FIG. 31 is a schematical cross-sectional view of a prism bar 4 as obtained according to FIGS. 29, 30.

Depending on where the prism bar 4 is separated into parts, different type I optical light guide elements can be obtained.

Figure 32:
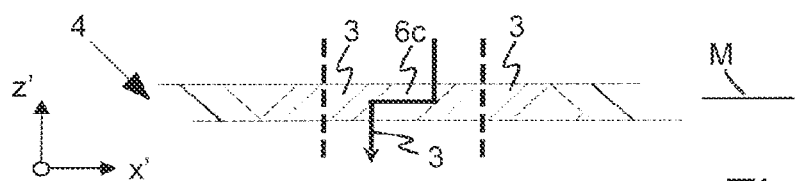

FIG. 32 is a schematical cross-sectional illustration of the prism bar 4 of FIG. 31, with separation lines illustrated for producing type I optical light guide elements with further bars 3 as filler bars. The light path is referenced L.

Figure 33:
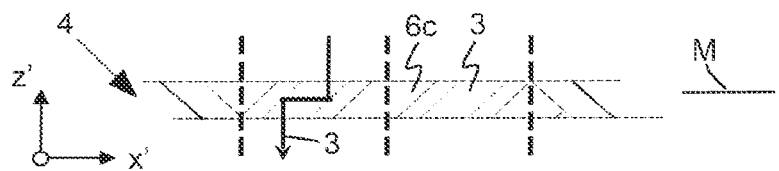

FIG. 33 is a schematical cross-sectional illustration of the prism bar 4 of FIG. 31, with separation lines illustrated for producing type I optical light guide elements with initial bars 2 as filler bars.

Figure 34:
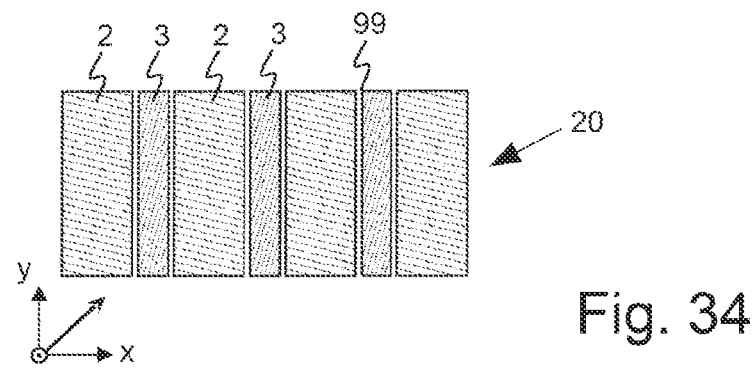
Figure 35:
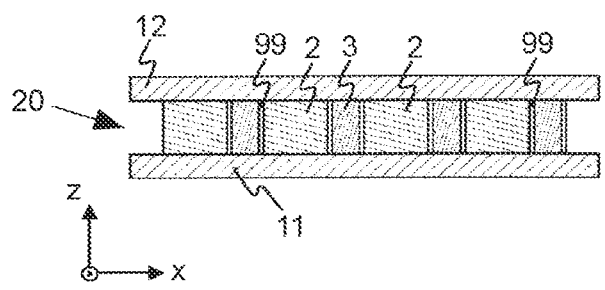

FIG. 34 is a schematical illustration in a top view of a bar arrangement 20 comprising further bars 3 and, at a distance thereto, initial bars 2 which are not coated. FIG. 35 is a schematical cross-sectional illustration of the bar arrangement 20 of FIG. 35 sandwiched between two substrates 11, 12. The space between neighboring initial bars 2 and further bars 3 is referenced 99.

Figure 36:
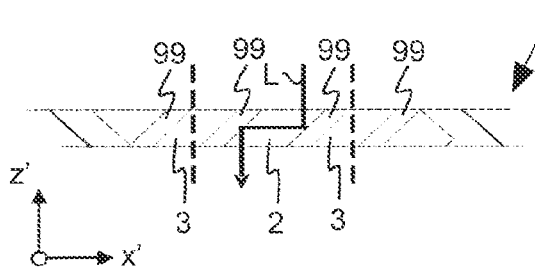

Separating the bar arrangement 20 of FIGS. 34, 35 like in the embodiments described above, results in prism bars 4 such as the one illustrated in FIG. 36.

FIG. 36 is a schematical cross-sectional illustration of a prism bar 4 obtained from the bar arrangement of FIG. 35, with separation lines illustrated for producing type I optical light guide elements with reflectivity at reflective faces by total internal reflection and with further bars 3 as filler bars.

Figure 37:
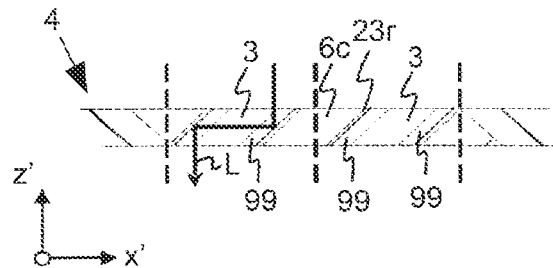

FIG. 37 is a schematical cross-sectional illustration of a prism bar 4 obtained from a bar arrangement with filler bars 3 at a distance to the initial bars 2 (spaces referenced 99), with separation lines illustrated for producing type III optical light guide elements with initial bars 2 as filler bars.

Figure 38:
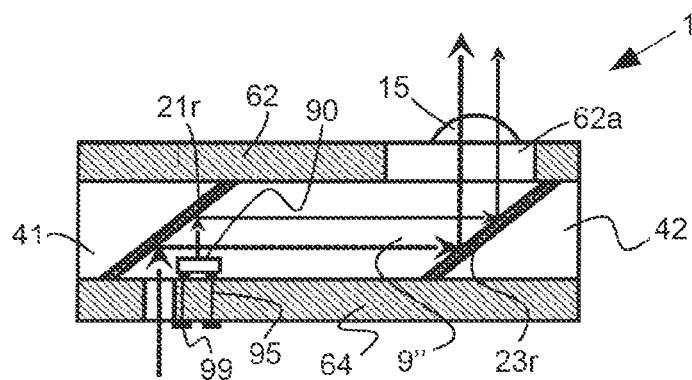

FIG. 38 is a schematical cross-sectional view of an optical light guide element 1 of type II including in the cavity 9" an opto-electronic component 90 at side panel 64. Side panel 64 is, in part, made of a non-transparent dielectric material. Side panel 64 can be, at least in part, a PCB.

Opto-electronic component 90 is attached to contact pads which are in electrical contact to further contact pads 99 outside cavity 9" by vias 95. By providing electrical contacts across the non-transparent dielectric material, optical light guide element 1 can be supplied with power and/or be controlled from outside optical light guide element 1.

In the illustrated example, optoelectronic component 90 is a light emitter. This way, light produced by optical light guide element 1 (more specifically: by optoelectronic component 90) can propagate along a path similar to (e.g., parallel to) the path of light guided through optical device 1.

In panel 62, a transparent region 62a is provided to which lens element 15 is attached. Panel 64 comprises a transparent region, too, for letting light pass through the otherwise non-transparent panel.

Considering the manufacturing steps and methods above (cf. also, e.g., FIGS. 23, 24), it is clear that the optical light guide element 1 can be produced when a printed circuit board is combined with the prism bars, i.e. the printed circuit board (with transparent regions) can be used as a further substrate which replaces or is a lens wafer. E.g., the further substrates to be used can be printed circuit boards to which opto-electronic components are attached. Accordingly, printed circuit board assemblies can be used as the further substrates.

Figure 39:
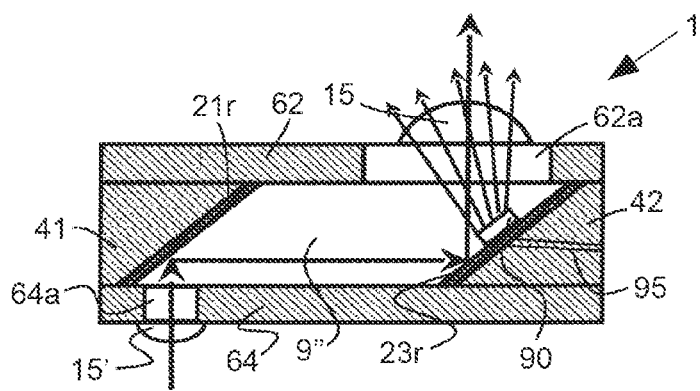

FIG. 39 is a schematical cross-sectional view of an optical light guide element 1 of type II including in the cavity 9" an opto-electronic component 90 at prism 42. This can be understood as an example for the possibility to produce a superposition of diffuse light (diffuse light produced by optical device 1, more specifically by opto-electronic component 90) and directed light (guided through optical light guide element 1).

FIG. 39 also illustrates that more than one passive optical component may be included in optical device 1. E.g., one (15) may be present at a panel (62) through which light exits optical light guide element 1, and another one (15') may be present at panel 64, attached to transparent region 64a through which light enters optical light guide element 1.

Considering the manufacturing steps and methods above (cf. also, e.g., FIGS. 7a-c, 8a-c), it is clear that the optical light guide element 1 can be produced when printed circuit boards are used as the initial bars. E.g., the plates 6 used to produce the initial bars 2 can be printed circuit boards, and opto-electronic components can be placed thereon. Accordingly, printed circuit board assemblies can be used as the plates 6.

As has been mentioned above, it is also possible to use initial bars 2 which are reflective only at one side (but not at the opposite side). They can be positioned, e.g., parallel to each other, to produce a bar arrangement, optionally with further bars 3 between the initial bars, wherein the further bars 3 can optionally have no reflective face, one reflective face, or two (oppositely arranged) reflective faces. Spaces 99 between neighboring bars can optionally be provided.

An exemplary method is described in detail in the following. The enclosed Figures illustrate and partially also comment details of that and of possible further methods.

1. Start with smooth (e.g., polished), coated wafer (herein "p/c wafer"—which corresponds to the "plate" described before). The first coating may be comprised of a highly reflective metal such as aluminum, silver, and/or gold or a dielectric material and may further comprise an additional coating material (e.g. Silflex) to enhance the optical properties of the metal coating and/or provide environmental protection. For example, when a silver coating is used the additional coating could prevent or reduce tarnishing.

2. The p/c wafer is further coated with a protective coating. The protective coating, e.g. a resin and/or photoresist, prevents damage to the first coating (e.g. a silver, Silflex coating) in the following step.
3. The p/c wafer is put into contact with a first dicing substrate (e.g. UV dicing tape).
4. The p/c wafer above is segmented into bars (herein "p/c bars"—which correspond to the "initial bars" described before). Segmentation may be accomplished via dicing, laser cutting and/or laser-scribe-and-break. In some cases when dicing, several passes of the dicing blade may be employed in order to reduce stresses in the p/c bars.
5. The p/c bars are released from the first dicing substrate (e.g. if UV dicing was employed, the assembly above is exposed to UV radiation in order to remove the UV dicing tape).
6. Alternative/additional step to the above, following 3: An easily removable adhesive (e.g. a wax or resin) is applied to the p/c wafer and an additional p/c wafer is put into contact with the first p/c wafer via the easily removable adhesive. Force may be applied to better adhere, spread the adhesive. This step may be repeated such that a multiple p/c wafer stack may be made. Following segmentation (as in step 4) each p/c bar is removed, the easily removable adhesive removed, e.g. via solvent, and the process continues with step 7.
7. The p/c bars above are rotated 90° about the p/c bar long axis (also referred to as "initial-bar direction") and placed into a positioning jig, e.g. by pick-and-place technology. The positioning jig is employed to position p/c bars precisely with respect to each other. Several versions of positioning jigs may be employed. A precisely machined/polished component of the positioning jig is common to each version. The precisely machined/polished component positions p/c bars with respect to each other (with a high degree of accuracy). Compression, vacuum, or easily removable adhesive is/are employed to hold the bars in place. Additional positioning jig details are disclosed in the attached figures and in the description.
8. After the p/c bars are fixed in place in the positioning jig, an adhesive (e.g. an adhesive that is UV or thermally curable, or both) is dispensed onto a first surface of the p/c bars and/or a first substrate. When adhesive is dispensed onto p/c bars, the adhesive is dispensed onto the long surface perpendicular to the coated surface. The adhesive may be dispensed via needle dispensing/jetting, or screen printing (onto the p/c bars, first substrate, or both). The first substrate may be transparent (e.g. a glass substrate) or may be substantially non-transparent (e.g. PCB material such as FR4/G10 or a silicon substrate).
9. The p/c bars (within the positioning jig) are brought into contact with the first substrate (via the adhesive). Force may be applied to better adhere, spread the adhesive. The adhesive is cured with UV radiation, heat or both UV radiation and heat, or partially cured e.g. via UV radiation alone. The form of curing energy depends on the type of substrate material used. For example, if the substrate is comprised of glass, UV radiation may be used, however, if the substrate is comprised of PCB or other non-transparent material heat may be used for curing.
10. Following curing (or partial curing) in the previous step the positioning jig is removed.
11. Adhesive is applied to a second surface of the p/c bars and/or a second substrate as above (e.g. via needle dispensing/jetting and/or screen printing). When adhesive is dispensed onto p/c bars, the adhesive is dispensed on a surface parallel to the first surface of the p/c bars (the surface with adhesive); that is, on a long surface perpendicular to a coated (metal) surface).
12. The p/c bars (adhered to the first substrate) are brought into contact with the second substrate via the adhesive. Force may be applied to better adhere, spread the adhesive.
13. The adhesive applied in the previous step (step 12) is cured with UV radiation, heat or both UV radiation and heat, or partially cured e.g. via UV radiation alone.
14. In some instance when previously applied adhesive is partially cured (as in steps 9 and/or 13), the adhesive may be fully cured e.g. by applying heat, additional heat. In some cases there may be advantages to full curing both wafers in the same step (e.g. better dimensional stability).
15. The first substrate+p/c bars+second substrate assembly (resulting from the previous steps—also referred to as "sandwich wafer" or "wafer stack" before) is segmented into bars (herein "prism bars"). Segmentation occurs at 45° relative to the p/c bars long axis and perpendicular to the plane of the first substrate+p/c bars+second substrate. Segmentation may occur as in the previous steps, e.g. by dicing. In some cases, many passes may be made with the dicing blade (in which successive amounts of material are cut away) in order to reduce stress, in other instances, the first substrate+p/c bars+second substrate may be diced partially from either side of the plane.
16. As the precision/accuracy of the segmentation techniques typically employed (as disclosed in previous steps) is not sufficient (e.g. for dicing may be +/−50 µm), the cut surface (the surface cut in step 15) may be polished in order to obtain well defined dimensions (e.g. +/−10 µm), in some instances when such accuracy/precision is required. These surfaces are particularly important as they define the z-height (and the optical path of the module, i.e. the light path inside the optical light guide element).
17. The prisms bars generated in the previous step may be attached to a lens wafer via adhesive and cured or partially cured (as disclosed above, within the spirit of the above). The lens wafer may be comprised of a transparent substrate (such as a glass wafer) or other transparent or non-transparent material (such as a PCB material; PCB=printed circuit board). In other cases where thermal dissipation may be critical (e.g. for optical quality) the substrate material may be a high (relatively high) thermal conductivity material (e.g. sapphire). In other instances the substrate material may be a low thermal expansion material (e.g. sapphire or other inorganic composites). The lens wafer is further comprised of lenses (lens elements). The lenses may be previously formed, cured on aforementioned wafer by known wafer level techniques. In other instances where improved lens quality is required pick-and-place technology may be used to position injection-molded lenses onto the aforementioned substrate (adhesive would have been previously applied by known technologies).
18. In some instances, additional lens wafers may be added to the lens wafer (via adhesive) where the adhesive is cured or partially cured as above.
19. An additional lens wafer may be added to the opposite side (within the spirit of steps 17 and 18). Further other optical elements may be added, and need not be added by wafer-level technology. E.g. pick and place may be used to position diffractive optical elements (DOEs) or other optical elements onto the lens wafers attached above.

20. After all lens wafers and optical elements have been added, the module is diced perpendicular to the lens wafer plane and long axis of the prism bars.

Note in any of the previous steps when adhesive is used to join components where their height is critical, a special adhesive may be used that is comprised of typical adhesive material and plastic or glass balls/spheres of a particular diameter. The spheres precisely define the ultimate thickness of the adhesive layer.

The various methods and embodiments described may, in some instances, permit the manufacture of light pipes (optical light guide elements) with a very low z height. Additionally, in some instances, very high precision alignment of and distancing between parts (constituents) of the light pipe and/or very high precision alignment of the light pipe and distancing between the light pipe and further items may be achievable. The described processes can employ smooth (e.g., polished) material (e.g., glass or other transparent material; or—in particular for type II light pipes, cf. above—also non-transparent material), which may be coated with a highly reflective coating. By smooth material we mean in the present context material having a planar surface, typically at least from micron scale to millimeter scale (the surface having a low roughness), e.g., like an ordinary mirror does. The provision of such material may make possible to overcome various technical challenges. The smooth material can be of importance for the light pipes. The smooth (e.g., polished and coated) sides effect that the entire smooth material can have a very well defined thickness. This thickness translates into a very well-defined optical path. In some cases, the smooth material is transparent (e.g., polished glass or a polished transparent polymer—e.g., having an index of refraction enabling total internal reflection), and in some other cases, the smooth material is a non-transparent (and possibly also non-reflective) material such as PCB material (e.g., fiber-reinforced epoxy), and in still some other cases, the smooth material is a reflective (in particular highly reflective) non-transparent material such as a metal, e.g., polished aluminum.

Figure 1:
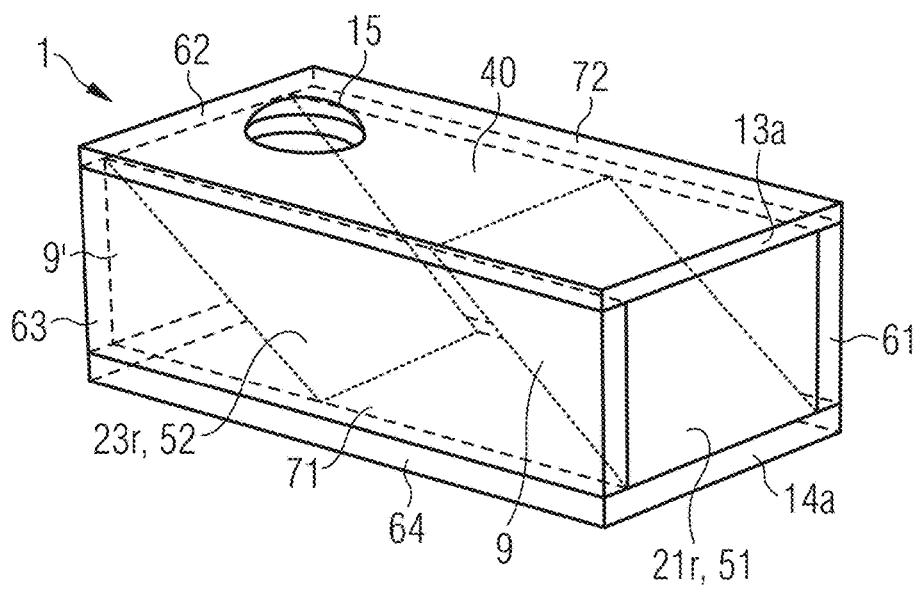
Figure 2:
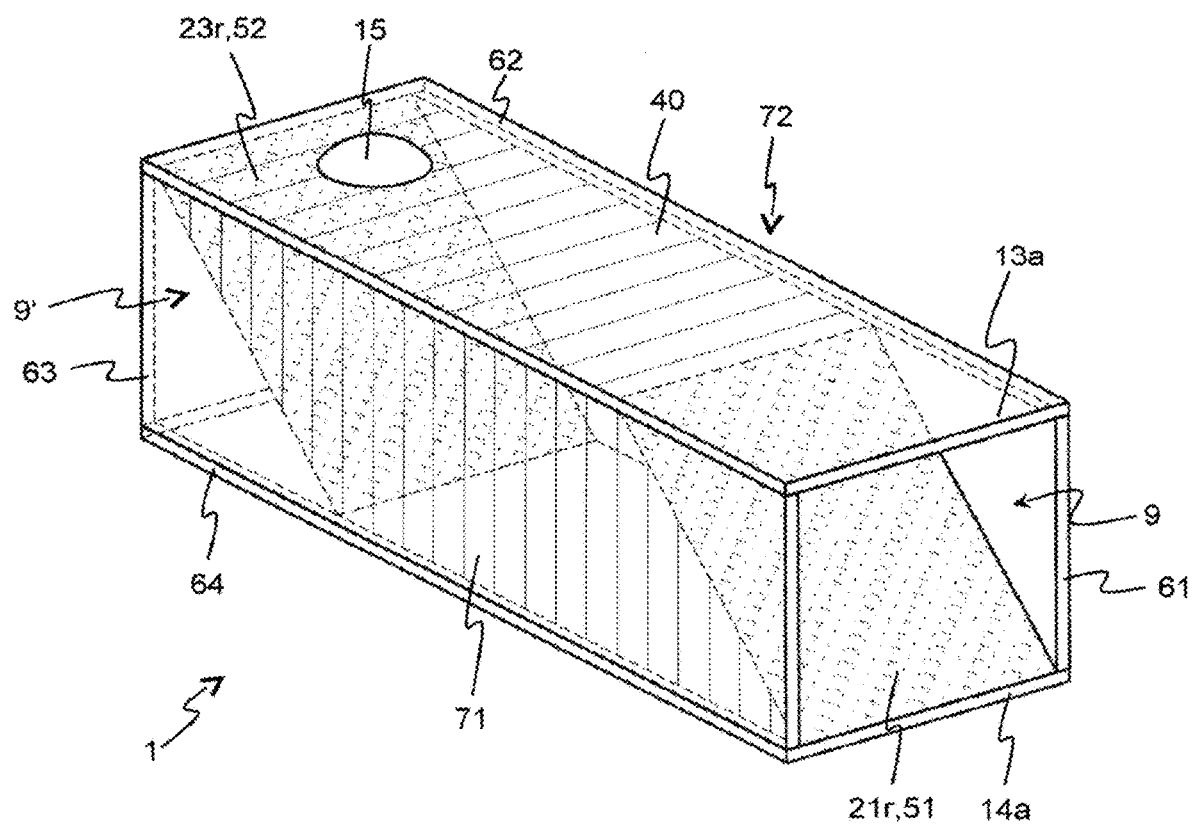
Figure 3:
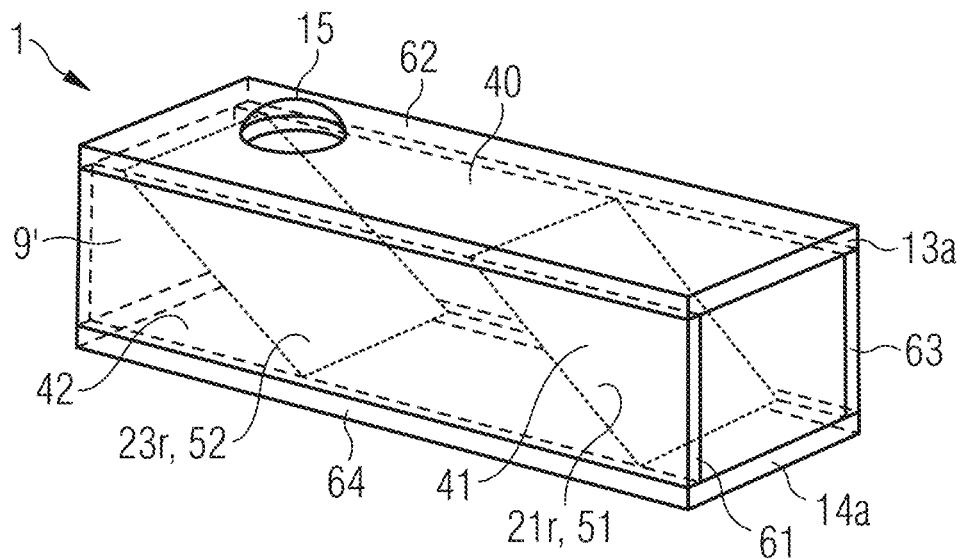
Figure 4:
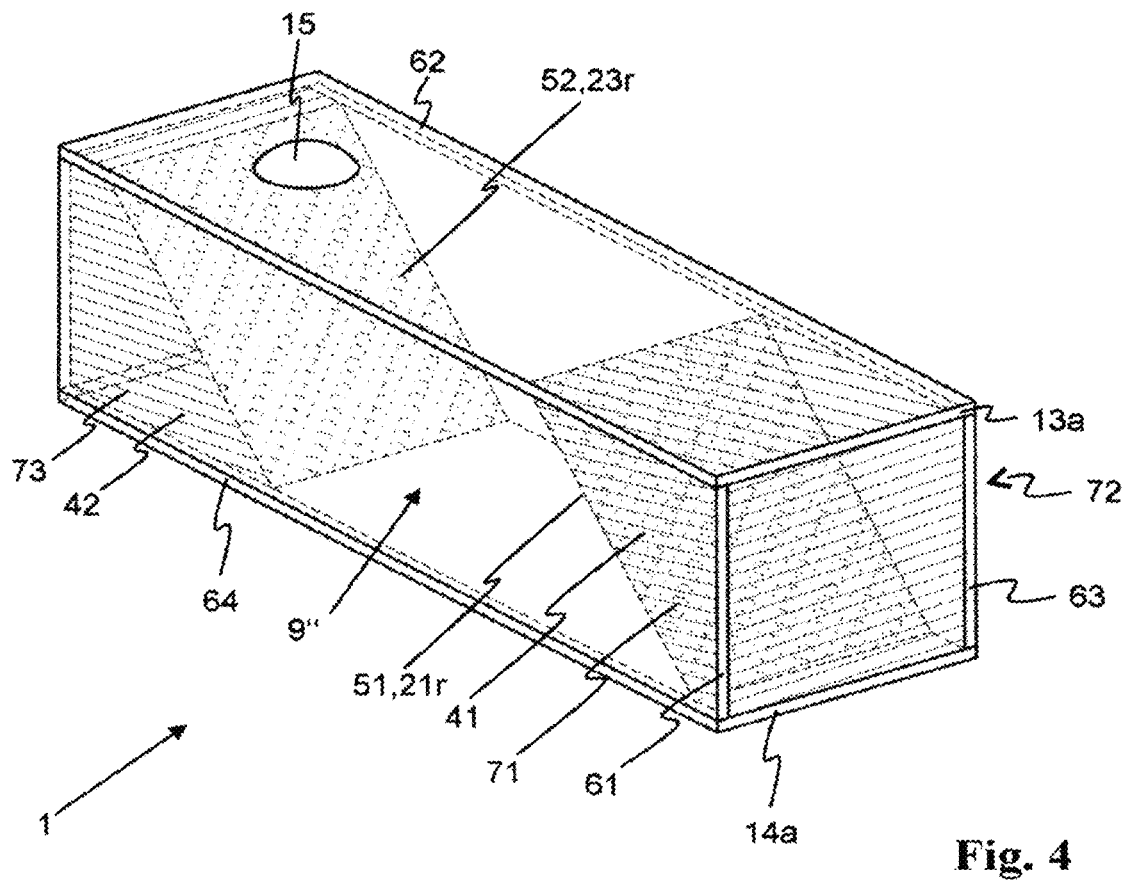
Figure 5:
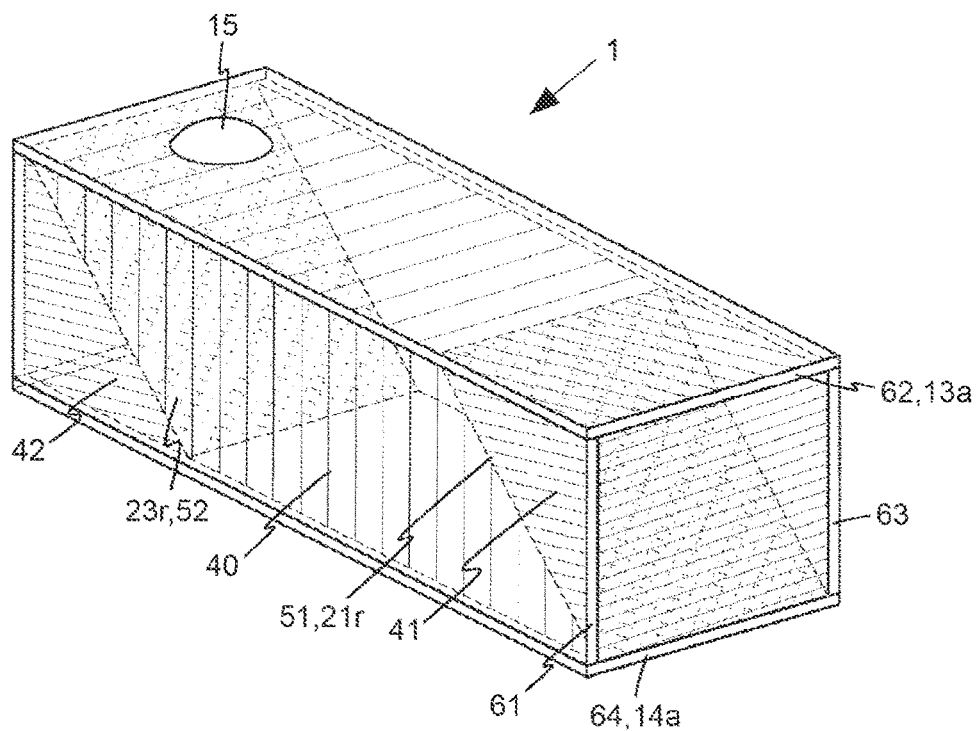
Figure 6:
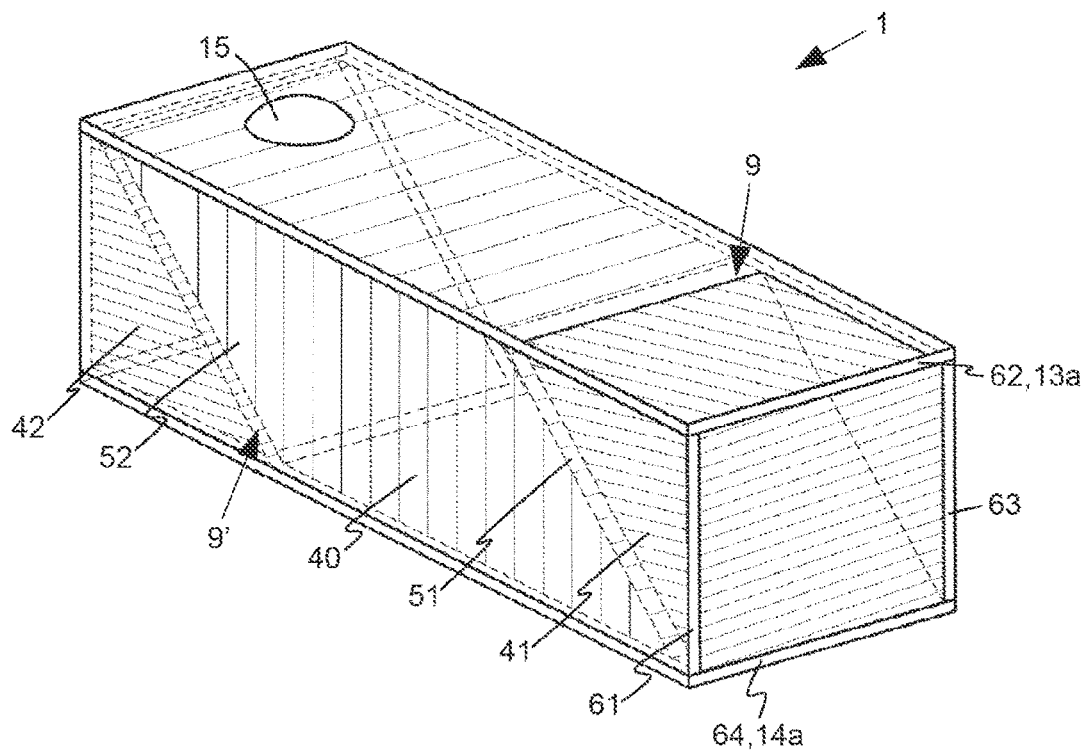
Figure 7A:
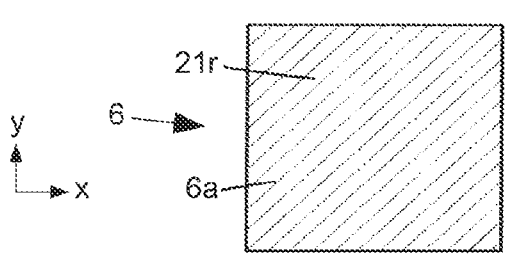
Figure 7B:
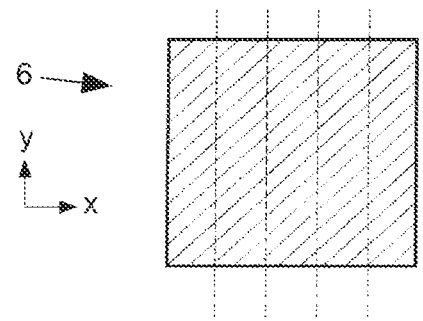
Figure 7C:
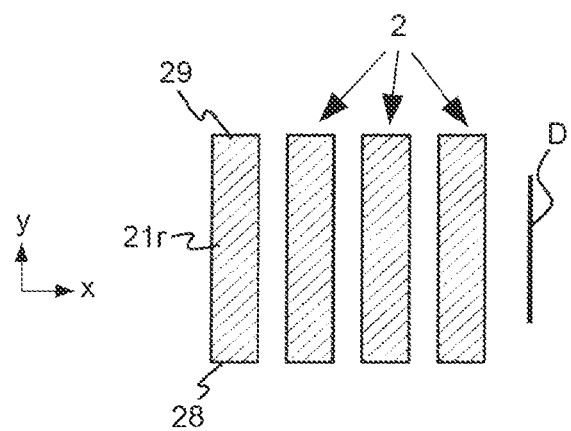
Figure 8A:
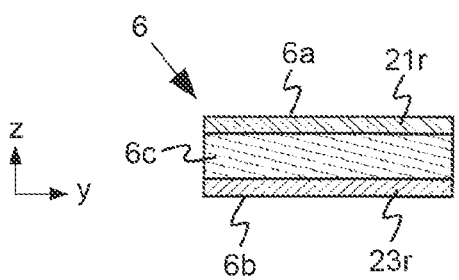
Figure 8B:
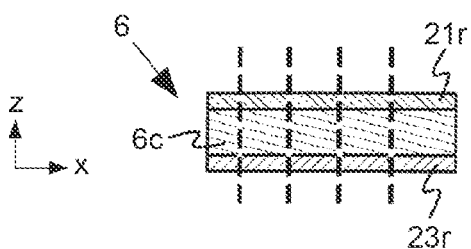
Figure 8C:
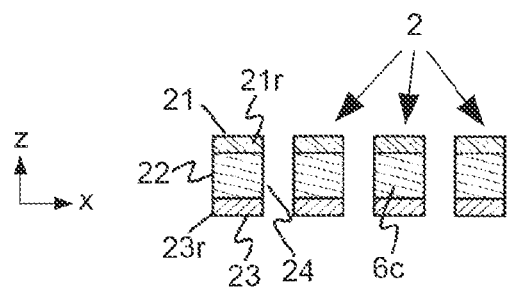
Figure 9A:
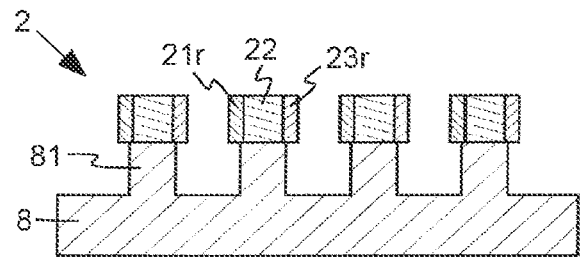
Figure 9B:
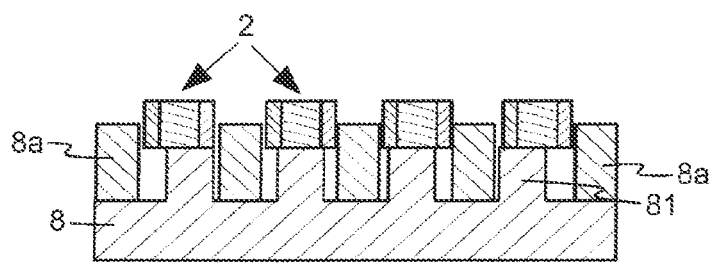
Figure 9C:
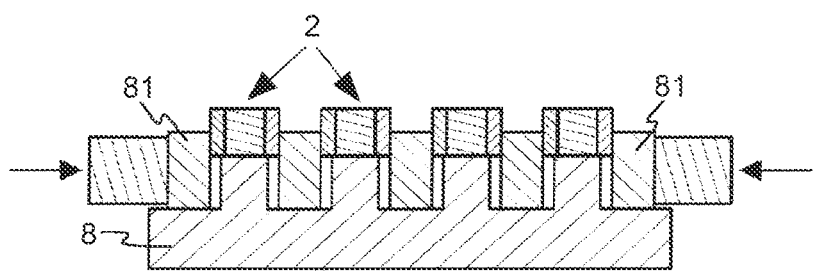
Figure 10A:
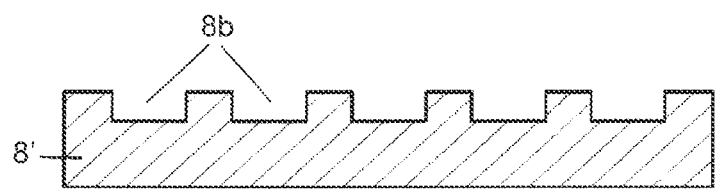
Figure 10B:
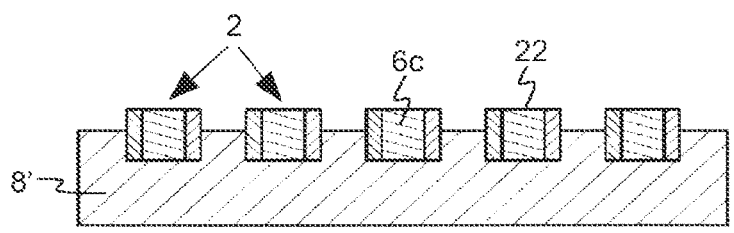

The smooth material (e.g., polished glass) mentioned above provides a well defined space/optical path 1.) directly (as in FIG. 1, type I), where the smooth material defines a prism, or 2.) indirectly (as in FIG. 3, type II), where an intervening jig with smooth sides is used in conjunction with two smooth material wafers to provide a well-defined optical path (the jig is only temporarily placed between the two prisms, then removed during processing).

What is claimed is:

1. A method for manufacturing parts for optical light guide elements, the method comprising
    a') providing a plate having an upper face and a lower face which are aligned parallel to each other;
    b') obtaining a plurality of initial bars, each initial bar extending along a respective initial-bar direction from a first bar end to a second bar end, by conducting a plurality of cuts through the plate which run parallel to each other and parallel to the initial-bar directions and which create cut faces which are aligned perpendicularly to the upper and lower faces,
        wherein the initial bars have a first side face extending from the first bar end to the second bar end, the first side face being reflective;
    b) rotating each initial bar by 90° about the respective initial bar direction and positioning the initial bars in a row with their respective initial-bar directions aligned parallel to each other and with their respective first side faces facing towards a neighboring one of the initial bars;
    c) fixing the plurality of initial bars with respect to each other in the position achieved in step b) to obtain a bar arrangement;
    d) segmenting the bar arrangement into prism bars by separating the bar arrangement into sections by creating cut faces which are at an angle with respect to the initial-bar directions; and
    e) segmenting the prism bars into parts.

2. The method according to claim 1, wherein at least one of
    each of the parts is formed in one of the optical light guide elements;
    each of the parts comprises one of the optical light guide elements.

3. The method according to claim 1, wherein each of the first side faces comprises a first reflective coating.

4. The method according to claim 1, wherein each of the first side faces is reflective due to total internal reflection.

5. The method according to claim 1, wherein, in step b), the initial bars are positioned in a distance to each other.

6. The method according to claim 5, wherein each of the initial bars has a first, a second, a third and a fourth side faces, each extending from the first to the second bar end, the first and second side faces being planar faces aligned parallel to each other, the third and fourth side faces being separated from each other by and arranged between the first and the second side faces.

7. The method according to claim 1, wherein the upper face and/or the lower face is reflective.

8. The method according to claim 1, comprising
    a*) providing a plurality of further bars, each further bar extending along a respective further-bar direction from a first further bar end to a second further bar end;
    b*) positioning, in step b), each of the further bars between two neighboring ones of the initial bars with their respective further-bar direction aligned parallel to the initial-bar directions;
    c*) fixing, in step c), the plurality of further bars with respect to each other and with respect to the initial bars in the position achieved in step b) to obtain the bar arrangement.

9. The method according to claim 8, comprising
    providing a further plate having an upper face and a lower face which are aligned parallel to each other;
    obtaining the plurality of further bars by conducting a plurality of cuts through the further plate which run parallel to each other and parallel to the further-bar directions and which create cut faces which are aligned perpendicularly to the upper and lower faces.

10. The method according to claim 1, comprising accomplishing the positioning mentioned in step b) by the aid of a jig.

11. The method according to claim 1, wherein the fixing mentioned in step c) comprises attaching a first substrate to the each of the initial bars.

12. The method according to claim 1, wherein step d) includes making cuts through the bar arrangement at an angle of between 20° and 75° with respect to the initial bar directions.

13. The method according to claim 1, comprising, before step e), attaching the prism bars to one or more further substrates, wherein the segmenting mentioned in step e) comprises segmenting the one or more further substrates.

14. The method according to claim 13, wherein each of the one or more further substrates comprises a wafer on which a plurality of lens elements are present.

15. The method according to claim 1, wherein each of the initial bars has a third side face extending from the first bar end to the second bar end, wherein each of the third side faces comprises a third reflective coating.

16. The method according to claim 11 wherein the fixing mentioned in step c) comprises, in addition, attaching a second substrate to the each of the initial bars to sandwich the initial bars between the first and second substrates.

17. The method according to claim 13 wherein each of at least two parts mentioned in step e) comprises a section of the one or more further substrates.

18. The method according to claim 14, wherein each of said parts comprises at least one of the lens elements.

19. The method according to claim 1, wherein:
   the prism bars each comprise a portion of at least two different ones of the plurality of initial bars; and
   the bar arrangement is segmented into prism bars by conducting a plurality of cuts through the bar arrangement.

20. The method according to claim 19,
   wherein the plurality of cuts are parallel cuts.

* * * * *